United States Patent
Yehia et al.

(10) Patent No.: US 8,505,002 B2
(45) Date of Patent: Aug. 6, 2013

(54) TRANSLATION OF SIMD INSTRUCTIONS IN A DATA PROCESSING SYSTEM

(75) Inventors: Sami Yehia, Boulogne Billancourt (FR);
Krisztian Flautner, Cambridge (GB);
Nathan Clark, Ann Arbor, MI (US);
Amir Hormati, Ann Arbor, MI (US);
Scott Mahlke, Ann Arbor, MI (US)

(73) Assignees: ARM Limited, Cambridge (GB); The Regents of the University of Michigan, Ann Arbor, MI (US)

( * ) Notice: Subject to any disclaimer, the term of this patent is extended or adjusted under 35 U.S.C. 154(b) by 1625 days.

(21) Appl. No.: 11/905,160

(22) Filed: Sep. 27, 2007

(65) Prior Publication Data

US 2008/0141012 A1 Jun. 12, 2008

Related U.S. Application Data

(60) Provisional application No. 60/847,909, filed on Sep. 29, 2006.

(51) Int. Cl.
*G06F 9/45* (2006.01)

(52) U.S. Cl.
USPC ........... 717/149; 717/140; 717/150; 717/160; 717/161

(58) Field of Classification Search
None
See application file for complete search history.

(56) References Cited

U.S. PATENT DOCUMENTS

| | | | | |
|---|---|---|---|---|
| 5,517,628 A | * | 5/1996 | Morrison et al. | 712/234 |
| 6,113,650 A | * | 9/2000 | Sakai | 717/160 |
| 7,237,089 B2 | * | 6/2007 | Suzuki | 712/22 |
| 7,376,812 B1 | * | 5/2008 | Sanghavi et al. | 712/24 |
| 2003/0145031 A1 | * | 7/2003 | Suzuki | 708/524 |
| 2004/0003381 A1 | * | 1/2004 | Suzuki et al. | 717/150 |
| 2004/0044915 A1 | * | 3/2004 | Bose et al. | 713/320 |
| 2004/0078549 A1 | * | 4/2004 | Tanaka et al. | 712/22 |
| 2004/0098709 A1 | * | 5/2004 | Kyo | 717/140 |
| 2004/0193838 A1 | * | 9/2004 | Devaney et al. | 712/3 |
| 2005/0097301 A1 | * | 5/2005 | Ben-David et al. | 712/22 |
| 2007/0038848 A1 | * | 2/2007 | Gschwind et al. | 712/225 |
| 2007/0233766 A1 | * | 10/2007 | Gschwind | 708/490 |
| 2007/0294512 A1 | * | 12/2007 | Crutchfield et al. | 712/200 |
| 2008/0222623 A1 | * | 9/2008 | Eichenberger et al. | 717/160 |
| 2008/0307402 A1 | * | 12/2008 | Eichenberger et al. | 717/151 |
| 2009/0144529 A1 | * | 6/2009 | Eichenberger et al. | 712/241 |

OTHER PUBLICATIONS

A. Aho, *Compilers, principles, techniques, and tools*, 1986, pp. 1-796.
ARM Limited, ARM926EJ-S Technical Reference Manual, 2001, pp. ii-Index-4.
T. Austin et al, "SimpleScalar: An Infrastructure for Computer System Modeling" Feb. 2002, pp. 59-67.
V. Bala et al, "Dynamo: A Transparent Dynamic Optimization System" 2000, pp. 1-12.

(Continued)

*Primary Examiner* — Isaac Tecklu
(74) *Attorney, Agent, or Firm* — Nixon & Vanderhye P.C.

(57) ABSTRACT

A data processing system is provided having a processor and analysing circuitry for identifying a SIMD instruction associated with a first SIMD instruction set and replacing it by a functionally-equivalent scalar representation and marking that functionally-equivalent scalar representation. The marked functionally-equivalent scalar representation is dynamically translated using translation circuitry upon execution of the program to generate one or more corresponding translated instructions corresponding to a instruction set architecture different from the first SIMD architecture corresponding to the identified SIMD instruction.

35 Claims, 14 Drawing Sheets

OTHER PUBLICATIONS

M. Baron, "Cortex-A8: High Speed, Low Power" Oct. 2005, Microprocessor Report, vol. 19, Archive 10, 1 page.

A. Bik et al, "Automatic Intra-Register Vectorization for the Intel® Architecture" *International Journal of Parallel Programming*, vol. 30, No. 2, Apr. 2002, pp. 65-98.

Breternitz, Jr. et al, "Compilation, Architectural Support, and Evaluation of SIMD Graphis Pipeline Programs on a General-Purpose CPU" 2003 IEEE, pp. 135-145.

D. Brooks et al, "Dynamically Exploiting Narrow Width Operands to Improve Processor Power and Performance" 1999 IEEE, pp. 13-22.

N. Clark et al, "Application-Specific Processing on a General-Purpose Core via Transparent Instruction Set Customization" 2004 IEEE, pp. 30-40.

N. Clark et al, "An Architecture Framework for Transparent Instruction Set Customization in Embedded Processors" 2005 IEEE, pp. 272-283.

J. Dehnert et al, "The Transmeta Code Morphing™ Software: Using Speculation, Recovery, and Adaptive Retranslation to Address Real-Life Challenges" 2003 IEEE, pp. 15-24.

K, Ebcioglu et al, "DAISY: Dynamic Compilation for 100% Architectural Compatibility" 1997, pp. 26-37.

A. Eichenberger et al, "Vectorization for SIMD Architectures with Alignment Constraints" 2004, pp. 82-93.

B. Fahs et al "Continuous Optimization" 2005 IEEE, pp. 86-97.

D. Friendly et al, "Putting the Fill Unit to Work: Dynamic Optimizations for Trace Cache Microprocessors" 1998 IEEE, pp. 173-181.

S. Gochman et al "The Intel® Pentium® M Processor: Microarchitecture and Performance" 2003, pp. 21-36.

I. Silas et al, "System-Level Validation of the Intel® Pentium® M Processor" 2003, pp. 37-43.

B. Grant et al, "DyC: an expressive annotation-directed dynamic compiler for C" *Theoretical Computer Science*, vol. 248, 2000, pp. 147-199.

S. Hu et al, "An Approach for Implementing Efficient Superscalar CISC Processors" 2006 IEEE, pp. 40-51.

S. Hu et al, "Using Dynamic Binary Translation to Fuse Dependent Instructions" Proceedings of the International Symposium on Code Generation and Optimization (CGO'04), 2004 IEEE, pp. 1-12.

A. Krall et al, "Compilation Techniques for Multimedia Processors" *International Journal of Parallel Programming*, vol. 28, No. 4, 2000, pp. 347-361.

S. Larsen et al, "Exploiting Vector Parallelism in Software Pipelined Loops" 2005 IEEE, pp. 119-129.

Y. Lin et al, "SODA: A Low-power Architecture for Software Radio" Proceedings of the 33$^{rd}$ International Symposium on Computer Architecture (ISCA'06), 2006 IEEE.

G. Loh et al, "Exploiting Data-Width Locality to Increase Superscalar Execution Bandwidth" 2002 IEEE, pp. 395-405.

R. Nair et al, "Exploiting Instruction Level Parallelism in Processors by Caching Scheduled Groups" 1997, pp. 13-25.

A. Pajuelo et al, "Speculative Dynamic Vectorization" 2002 IEEE, pp. 271-280.

S. Patel et al, "rePLay: A Hardware Framework for Dynamic Optimization" *IEEE Transactions on Computers*, vol. 50, No. 6, Jun. 2001.

V. Petric et al, "RENO: A Rename-Based Instruction Optimizer" 2005 IEEE, pp. 98-109.

P. Sassone et al, "Static Strands: Safely Collapsing Dependence Chains for Increasing Embedded Power Efficiency" 2005, pp. 127-136.

L. Chakrapani et al, "Trimaran: An Infrastructure for Research in Instruction-Level Parallelism" 2004, pp. 32-41.

S. Vajapeyam et al, "Dynamic Vectorization: A Mechanism for Exploiting Far-Flung ILP in Ordinary Programs" 1999 IEEE, pp. 16-27.

P. Wu et al, "Efficient SIMD Code Generation for Runtime Alignment and Length Conversion" Proceedings of the International Symposium on Code Generation and Optimization (CGO'05).

S. Yehia et al, "From Sequences of Dependent Instructions to *Functions*: An Approach for Improving Performance without ILP or Speculation" 2004 IEEE, pp. 238-249.

\* cited by examiner

| SIMD Category | Example SIMD Instruction | Scalar Equivalent | Comments |
|---|---|---|---|
| (1) Data parallel; operates on two vectors | v1 = vadd v2, v3 | r1 = add r2, r3 | Used for any operation which has an equivalent scalar operation. SIMD operations without a scalar equivalent (e.g., saturating arithmetic) must construct an idiom using multiple instructions |
| (2) Data parallel; operates on a vector and a scalar supported constant | v1 = vand v2, 0xFF | r1 = add r1, 0xFF | Analogous to category (1) |
| (3) Data parallel; operates on a vector and non-scalar supported constant | v1 = vor v2, 0xFF00FF00 | r3 = ld [cnst + ind]<br>r1 = or r2, r3 | Compiler inserts a read-only array, cnst, into the code, which stores the unsupported constant. The array is indexed using the loops induction variable to retrieve the appropriate portions during each scalar iteration. |
| (4) Reductions; multiple vector elements used to compute one result | r1 = vmin v2 | r1 = min r1, r2 | Loop-carried dependence (r1) is used to represent that each element of the vector is used to calculate one result |
| (5) Memory accesses | v1 = vldb [addr] | r1 = ldb [addr + ind] | Induction variable is used to select one vector element to operate on each iteration. Loads are used to identify width of vector elements (e.g., byte or halfword) |
| (6) Base-plus-displacement memory accesses | [addr + r1] = vstr v2 | r3 = add r1, ind<br>[addr + r3] = str r2 | Similar to category (5). |
| (7) Permutations; reorders vector elements | v2 = vld [addr]<br>v1 = vbfly v2 | r3 = ld [bfly + ind]<br>r4 = add ind, r3<br>r1 = ld [addr + r4] | Compiler inserts a read-only array, bfly, into the code, which stores how elements are reordered. This is used in conjunction with the induction variable to bring in vector elements in a different order. Values stored in bfly uniquely identify a permutation. |
| (8) Permutations; reorders vector elements | v1 = vbfly v2<br>[addr] vstr v1 | r3 = ld [bfly + ind]<br>r4 = add ind, r3<br>[addr + r4] = str r1 | Analogous to category (7), but writes elements to memory in a different order, instead of reading them. |

FIG. 6

```
for (i = 0; i < 128; i += 8)  {
   for (j = i, n = 0; n < 4; j++, n++)  { k = j + 4;

tr = ar[i]  *  RealOut [k] -
           ai[i]  *  ImagOut [k] ;

RealOut [k] = RealOut [j] - tr;
      RealOut [j] += tr;
   }
}
```

FIG. 7A

| Scalar Instruction | Current Register State | Updated Register State | Instruction(s) Generated |
|---|---|---|---|
| (1) r1 = mov # const | | r1 is marked as the induction variable | r1 = mov # const |
| (2) r1 = ld [r2 + r3] | r2 is scalar; r3 is the induction variable | r1 is a vector; size of r1 is recorded (i.e., byte, halfword, etc.); value loaded is stored in r1 | v1 = vld [r2 + r3] |
| (3) r1 = ld [r2 + r3] | r2 is a scalar; r3 is a vector; r3 has values loaded into it from an offset array | r1 is a vector; size of r1 is recorded | v1 = vld [r2 + ind]<br>v1 = vpermute v1 |
| (4) [r1 + r2] = str r3 | r1 is a scalar; r2 is the induction variable | | [r1 + r2] = vstr v3 |
| (5) [r1 + r2] = str r3 | r1 is a scalar; r2 is a vector; r2 has values loaded into it from an offset array | | v3 = vpermute v3<br>[r1 + r2] = vstr v3 |
| (6) r1 = dp r2, r3 | r2 is a vector; r3 is a vector | r1 is a vector; size of r1 is recorded | v1 = vdp v2, v3 |
| (7) r1 = dp r2, r3 | r2 is a vector; r3 is a scalar; r3 has values loaded into it | r1 is a vector; size of r1 is recorded | v1 = vdp v2, # const |
| (8) r1 = dp r2, r3 | r2 is a vector; r3 is the induction variable (or vice-versa); r2 has values loaded into it | r1 is a vector; values loaded into r2 are copied to r1 | None: this format is only used to update the induction variable for permutations |
| (9) r1 = dp r1, r2 | r1 is a scalar; r2 is a vector | r1 is a scalar | r1 = vred v2 |
| (10) r1 = add r1, #1 | r1 is the induction variable | | r1 = add r1, SIMD_width |
| (11) any other instruction | all source operands are scalar | | The input instruction is passed unmodified |

FIG. 10

| | Scalar Instruction | SIMD Generated |
|---|---|---|
| 1 | mov r0, #0 | mov r0, #0 |
| 2 | ld r1, [bfly + r0] | v1 = vld [bfly +r0] |
| 3 | add r1, r0, r1 | |
| 4 | ld f0, RealOut + r1] | vf0 = vfld [RealOut + r0]<br>vf0 = vbfly vf0 |
| 5 | ld f1, [ImagOut + r1] | vf1 = vfld [ImagOut + r0]<br>vf1 = vbfly vf1 |
| 6 | ld f2, [ar + r0] | vf2 = vfld [ar + r0] |
| 7 | ld f3, [ai + r0] | vf3 = vfld [ai + r0] |
| 8 | mult f2, f2, f0 | vf2 = vmult vf2, vf0 |
| 9 | mult f3, f3, f1 | vf3 = vmult vf3, vf1 |
| 10 | sub f6, f2, f3 | vf6 = vsub vf2, vf3 |
| 11 | ld f5, [RealOut + r0] | vf5 = vld [RealOut + r0] |
| 12 | sub f3, f5, f6 | vf3 = vsub vf5, vf6 |
| 13 | add f4, f5, f6 | vf4 = vadd vf5, vf6 |
| 14 | ld r2, [mask + r0] | v2 = vld [mask + r0] |
| 15 | and f3, f3, r2 | vf3 = vmask vf3, # const |
| 16 | and f4, f4, r2 | vf4 = vmask vf4, # const |
| 17 | ld r3, [bfly + r0] | v3 = vld [bfly + r0] |
| 18 | add r3, r0, r3 | |
| 19 | str [tmp0 + r3], f3 | vf3 = vbfly vf3<br>[tmp0 + r0] = vstr vf3 |
| 20 | str [tmp1 + r0], f4 | vf4 = vbfly vf4<br>[tmp1 + r0] = vstr vf4 |
| 21 | add r0, r0, #1 | r0 = add r0, #8 |
| 22 | cmp r0, #128 | cmp r0, #128 |
| 23 | blt Top_of_loop_1 | blt Top_of_loop_1 |

FIG. 11

| Benchmark | Mean | Max |
|---|---|---|
| 0.52.alvinn | 12.5 | 13 |
| 056.ear | 34.5 | 36 |
| 093.nasa7 | 45.5 | 59 |
| 101.tomcatv | 35.5 | 61 |
| 104.hydro2d | 27.2 | 40 |
| 171.swim | 37.8 | 51 |
| 172.mgrid | 46.2 | 62 |
| 179.art | 12.8 | 19 |
| MPEG2 Dec. | 12.5 | 13 |
| MPEG2 Enc. | 14.5 | 19 |
| GSM Dec. | 25 | 25 |
| GSM Enc. | 19.5 | 28 |
| LU | 11 | 11 |
| FIR | 11 | 11 |
| FFT | 31.3 | 38 |

FIG. 12A

| Benchmark | <150 | <300 | >300 | Mean |
|---|---|---|---|---|
| 0.52.alvinn | 0 | 0 | 2 | 19984 |
| 056.ear | 0 | 0 | 3 | 96488 |
| 093.nasa7 | 0 | 0 | 12 | 23876 |
| 101.tomcatv | 0 | 0 | 6 | 16036 |
| 104.hydro2d | 0 | 0 | 18 | 24346 |
| 171.swim | 0 | 0 | 9 | 33258 |
| 172.mgrid | 0 | 0 | 13 | 5218 |
| 179.art | 0 | 0 | 5 | 2102224 |
| MPEG2 Dec. | 0 | 1 | 1 | 269 |
| MPEG2 Enc. | 0 | 3 | 1 | 257 |
| GSM Dec. | 0 | 0 | 1 | 358 |
| GSM Enc. | 0 | 0 | 1 | 538 |
| LU | 0 | 0 | 1 | 15054 |
| FIR | 0 | 0 | 1 | 13343 |
| FFT | 0 | 0 | 3 | 7716 |

FIG. 12B

TRANSLATION OF SIMD INSTRUCTIONS IN A DATA PROCESSING SYSTEM

This application claims the benefit of U.S. provisional application No. 60/847,909 filed on Sep. 29, 2006.

BACKGROUND OF THE INVENTION

1. Field of the Invention

The present invention relate to a data processing system. More particularly, the present invention relates to a data processing system for translating single instruction multiple data (SIMD) instructions corresponding to a first SIMD architecture to a translated instructions corresponding to a different instruction set architecture.

2. Description of the Prior Art

It is known to use SIMD accelerators in data processing systems in order to accelerate execution of program code. SIMD accelerators are popular across desktop and embedded processor families, providing large performance gains at low cost and energy overheads. SIMD accelerators perform the same functional operation on a plurality of data items substantially simultaneously using a single instruction.

In fact, SIMD accelerators have become ubiquitous in modern general purpose processors. MMX, SSE, 3DNow!, and AltiVec are all examples of instruction set extensions that are tightly coupled with specialized processing units to exploit data parallelism. A SIMD accelerator is typically implemented as a hardware coprocessor composed of a set of functional units and an independent set of registers connected to the processor through memory. SIMD accelerator architectures vary based on the "SIMD width" of the vector data (i.e. number of data items on which the same operation is performed) along with the SIMD functionality, which depends upon the number and type of available functional units. This allows for diversity in two dimensions: the number of data elements that may be operated on substantially simultaneously and the set of available operations.

In order to invoke the hardware of SIMD accelerators, the basic scalar instruction set of a given processor is typically extended to incorporate a set of SIMD instructions (or "vector instructions"). Intel's MMX and SSE extensions are examples of two generations of such instructions for the x86 Instruction Set Architecture (ISA). However, as data processing systems evolve there is a tendency for the architecture of the SIMD accelerator to change, for example, to extend the SIMD width and/or the SIMD functionality. Such changes to the SIMD accelerator architecture typically involve completely rewriting a program application that it is targeted for a different SIMD accelerator architecture, but which it is desired to run on the updated system. Such rewriting of program applications is time consuming, error prone and tedious.

It is also known to employ delayed binding of computer program object code in order to improve the flexibility of data processing systems. For example, dynamic linkers are used to delay binding of object code to improve the portability and space efficiency of applications. Dynamic compilers make use of delayed binding to form code optimisations which take account of a program's run time environment. However, when known systems that employ delayed binding in compilers and linkers are implemented in hardware they are typically difficult to deploy.

With larger hardware budgets and more demands for performance, SIMD accelerators evolve with both larger data widths and increased functionality with each new generation. However, this causes difficult problems in terms of binary compatibility, software migration costs, and expensive redesign of the instruction set architecture. Thus, whilst SIMD extensions to a given instruction set architecture are known to improve data processing performance, the forward migration path from generation to generation of SIMD accelerators can be problematic.

SUMMARY OF THE INVENTION

According to a first aspect the present invention provides apparatus for processing data under control of a program having a plurality of program instructions, said apparatus comprising:

a processor;

analysing circuitry for analysing at least a portion of said program to identify a SIMD instruction associated with a first SIMD instruction set architecture and replacing said identified SIMD instruction by a functionally-equivalent scalar representation comprising one or more scalar instructions of an instruction set architecture of said processor and for marking said functionally-equivalent scalar representation; and translation circuitry for dynamically translating said marked functionally-equivalent scalar representation upon execution of said program to generate one or more corresponding translated instructions;

wherein said translated instructions correspond to an instruction set architecture different from said first SIMD architecture.

The present invention recognises that the problems associated with program code having SIMD instructions associated with a particular SIMD instruction set architecture can be ameliorated by translating these instructions to functionally-equivalent scalar representations and marking the translated instructions such that they can be identified by dynamic translation circuitry for translation at run-time to instructions corresponding to a different instruction set architecture (e.g., a different SIMD instruction set architecture).

This allows program code comprising a given set of SIMD instructions to be decoupled from a particular SIMD accelerator and enables the program code to be executed on a data processing system having a different SIMD accelerator. This avoids the need to rewrite program code corresponding to a first SIMD instruction set architecture in order to execute it on a data processing system having a second, different instruction set architecture.

Furthermore, program code including one or more SIMD instructions can be executed using scalar processing circuitry by making use of the functionally equivalent scalar representations generated by the analysing circuitry.

The present invention also enables new generations of SIMD accelerators to be deployed and enhanced without having to alter the existing instruction set. Effectively, the present technique enables program code including SIMD instructions to be decoupled from the SIMD accelerator hardware for which it was originally intended by translating those SIMD instructions to functionally equivalent scalar representations capable of dynamic translation. For example, in order to extend the SIMD vector width of a given SIMD accelerator according to at least embodiments of the present invention, there will be no need to alter the existing program code or to recompile existing applications to run on the updated SIMD architecture. Instead, the change in vector width can be accommodated simply by updating the translation circuitry to reflect the change in SIMD width.

In one embodiment the translated instructions generated from the functionally equivalent scalar representation of the SIMD instruction corresponding to the first SIMD instruction set are scalar instructions. This allows existing code comprising SIMD instructions to be readily executed on data processing systems not having SIMD accelerators.

In other embodiments the translation circuitry generates from the functionally-equivalent scalar representation, SIMD instructions corresponding to a second SIMD architecture different from the first SIMD architecture with which the input program instruction was associated. This facilitates migration from one generation of SIMD accelerator to a subsequent generation of SIMD accelerator and avoids the requirement to substantially rewrite the original program code to accommodate the migration.

In one embodiment, the difference between the first SIMD architecture and the second SIMD architecture corresponds to a difference in SIMD vector-width. As data processing systems evolve it expected that the SIMD vector width will increase. This is readily accommodated by dynamic translation of the functionally equivalent scalar representations.

In another embodiment, the difference between the first SIMD architecture and the second SIMD architecture corresponds to a difference in SIMD functionality. The SIMD op-code repertoire is also commonly enhanced from generation to generation to account for new functionality present in the latest applications, this provides for such changes to be readily and efficiently accommodated. For example, the number of op-codes in the ARM SIMD instruction set evolved from 60 to more than 120 in a change between version 6 and version 7 of the instruction set architecture. Even such significant changes in the number of op codes can be accommodated by the dynamic translation according to the present technique.

In one embodiment, the analysing circuitry is arranged to perform the replacement of the identified SIMD instruction during compilation of the portion of program code. In one such embodiment, the compilation is a dynamic compilation. In alternative embodiments, the replacement of SIMD instructions is performed as a separate stage prior to execution of the program code. In alternative embodiments, the analysing circuitry is arranged to perform the replacement of the SIMD instruction corresponding to the first SIMD architecture using a post-compilation cross-compiler. This reduces the likelihood that any changes will be needed to the compiler in order to accommodate differences in SIMD architecture.

In one embodiment, the marking of the functionally equivalent scalar representation of the SIMD instruction of the first SIMD instruction set architecture comprises outlining the functionally equivalent scalar representation as a predetermined function. For example, in one particular embodiment of this type, the function used for outlining is a branch-and-link instruction followed by a return instruction. This is straightforward to implement and enables ready identification of the functionally equivalent scalar representation by the dynamic translation circuitry.

In another embodiment, the marking of the functionally-equivalent scalar representation is performed using an instruction set encoding. Provision of one or more dedicated instructions in the instruction set encoding to mark the functionally-equivalent scalar representation reduces the likelihood that a given section of program code will be erroneously identified by the dynamic translation as amenable to a translation for execution using a different instruction set architecture.

In a further embodiment, the marking of the functionally-equivalent scalar representation comprises storing information identifying the functionally-equivalent scalar representation in a data table in memory. This is straightforward to implement yet reliable and avoids the likelihood that changes will have to be made to the existing instruction set architecture.

It will be appreciated that the functionally-equivalent scalar representation generated by the analysing circuitry can take any one of a number of different forms provided that the processing operations specified by the SIMD instruction associated with the first SIMD instruction set are performed in the manner intended. However, in one embodiment, the analysing circuitry is arranged to generate the functionally-equivalent scalar representation by replacing a corresponding identified SIMD instruction by a scalar loop in which one element of a SIMD vector associated with the identified SIMD instruction is processed per iteration. This provides a translation which is easy to implement, yet effective in achieving the required functionality. Using simple scalar loop replacements provides for less complex dynamic translation circuitry, which in turn makes the dynamic translation more amenable to implementation in dedicated hardware.

In another embodiment, the analysing circuitry is arranged to generate the functionally-equivalent scalar representation by replacing a given SIMD instruction by a predetermined instruction sequence comprising a plurality of scalar instructions. This enables the dynamic translator to readily recognise that a given sequence of scalar instructions represents one SIMD instruction and thus makes the dynamically translated code more efficient. Since the scalar instruction set of a data processing apparatus is typically "Turing complete", any data-parallel SIMD instruction can, at least in principle, be represented using scalar instructions. Replacing an identified SIMD instruction by such a scalar instruction sequence (or "idiom") enables SIMD operations that do not have an obvious scalar equivalent to be translated by the translation circuitry. An example of a SIMD operation that does not have a scalar equivalent is an instruction associated with saturating arithmetic, which many SIMD instruction set architectures support.

In one embodiment, where the identified SIMD instruction is a permutation instruction, the analysing circuitry is arranged to restrict the functionally-equivalent scalar representation such that the permutation instruction occurs only at memory boundaries of scalar loops of instructions. This increases the likelihood that the correct data element will be loaded for each iteration. This can be difficult to ensure when SIMD operations that involve changing the order of vector elements are translated into scalar loop representations.

Although the data processing apparatus according to the present technique could be implemented using many different types of processor, in one embodiment the processor is a pipelined data processor arranged to process the portion of program code using an instruction pipeline comprising a plurality of pipeline stages.

In one such embodiment having a pipelined processor, the translation circuitry is arranged to perform the dynamic translation after requirement of the scalar representation from the instruction pipeline. Use of post-retirement dynamic translation means that the dynamic translation is far-off the critical path of the processor and this reduces any adverse impact of the dynamic translation on the efficiency of the data processing. In fact, such post-retirement dynamic translation can even be hundreds of cycles long without appreciably impacting the performance of the processor.

In an alternative embodiment, the translation circuitry is arranged to perform the dynamic translation at a decoding stage of the instruction pipeline. This enables the dynamic translation to be implemented immediately when it has been produced and avoids the need to store the modified microcode in the cache for insertion into the control stream in the pipeline front-end.

In one embodiment, in which the translation circuitry performs dynamic translation after retirement of instructions from the pipeline, a microcode cache is provided for storing the translated instructions for subsequent execution by the processor.

In one embodiment, the translation circuitry is implemented at least in part by hardware. Hardware translation is likely to be more efficient that software translation yet it adds little overhead to the processor of the data processing apparatus.

In another embodiment, the translation circuitry is arranged to perform the dynamic translation using software. This makes the dynamic translation system more flexible and adaptable to any required changes. In some such embodiments, the dynamic translation software comprises a virtual machine and in other embodiments the dynamic translation software comprises a just-in-time compiler.

According to a second aspect the present invention provides method for processing data under control of a program having a plurality of program instructions, said method comprising:

analysing at least a portion of said program to identify a SIMD instruction associated with a first SIMD instruction set architecture and replacing said identified SIMD instruction by a functionally-equivalent scalar representation comprising one or more scalar instructions of an instruction set architecture of said processor and for marking said functionally-equivalent scalar representation; and dynamically translating said marked functionally-equivalent scalar representation upon execution of said program to generate one or more corresponding translated instructions;

wherein said translated instructions correspond to an instruction set architecture different from said first SIMD architecture.

According to a third aspect the present invention provides method of dynamically translating program instructions comprising at least one marked functionally-equivalent scalar representation of a SIMD instruction corresponding to a first SIMD instruction set architecture, said method comprising:

dynamically translating said marked functionally-equivalent scalar representation upon execution of said program to generate one or more corresponding translated instructions.

wherein said translated instructions correspond to an instruction set architecture different from said first SIMD architecture.

According to a fourth aspect the present invention provides a computer program on a carrier medium comprising a program having program instructions comprising functionally-equivalent scalar representations of respective SIMD instructions corresponding to a first SIMD instruction set architecture, said functionally-equivalent scalar representations being marked to enable identification by a dynamic translator for dynamic translation to translated instructions corresponding to a different instruction set architecture from said first SIMD instruction set architecture.

According to a fifth aspect, the present invention provides an apparatus for dynamically translating program instructions comprising at least one marked functionally-equivalent scalar representation of a SIMD instruction corresponding to a first SIMD instruction set architecture, said apparatus comprising:

translation circuitry for dynamically translating said marked functionally-equivalent scalar representation upon execution of said program to generate one or more corresponding translated instructions.

wherein said translated instructions correspond to an instruction set architecture different from said first SIMD architecture.

According to a sixth aspect, the present invention provides a method of compiling a program comprising at least one SIMD instruction corresponding to a first SIMD instruction set architecture, said method comprising:

identifying said at least one SIMD instruction;

replacing said identified SIMD instruction by a functionally-equivalent scalar representation comprising one or more scalar instructions; and marking said functionally-equivalent scalar representation.

The present technique offers a number of advantages for families of processor implementations. Firstly, it allows SIMD accelerators to be deployed without having to alter the instruction set and thus can avoid introducing instruction set architecture compatibility problems. These problems can be prohibitively expensive for many practical purposes. Secondly, delayed binding allows an application to be developed for one accelerator, but be utilized by completely different accelerators (e.g., an older or newer generation SIMD accelerator). This eases non-recurring engineering costs in evolving SIMD accelerators or enables companies to differentiate processors based on acceleration capabilities provided. Finally, translated SIMD code according to the present technique system can be run on processors with no SIMD accelerator or translator, simply by using native scalar instructions.

The above, and other objects, features and advantages of this invention will be apparent from the following detailed description of illustrative embodiments which is to be read in connection with the accompanying drawings.

BRIEF DESCRIPTION OF THE DRAWINGS

FIG. 6 shows a table that schematically illustrates an example set of conversion rules for the SIMD abstraction process of FIG. 3;

FIG. 7A is a section of program code corresponding to a Fast Fourier Transform (FFT) kernel having SIMD instructions corresponding to a first SIMD instruction set architecture and suitable for translation to a functionally-equivalent scalar representation;

FIG. 10 schematically illustrates a table specifying rules for dynamic translation of scalar code of the functionally-equivalent scalar representation to scalar code;

FIG. 11 schematically illustrates an example involving translating the scalar loop of FIG. 8B back into SIMD instructions for an 8-wide SIMD accelerator;

FIG. 12A is a table detailing the number of scalar instructions in outlined functions in a series if test simulations performed to evaluate the present technique;

FIG. 12B is a table providing simulation results; and

DESCRIPTION OF THE PREFERRED EMBODIMENTS

Figure 1:
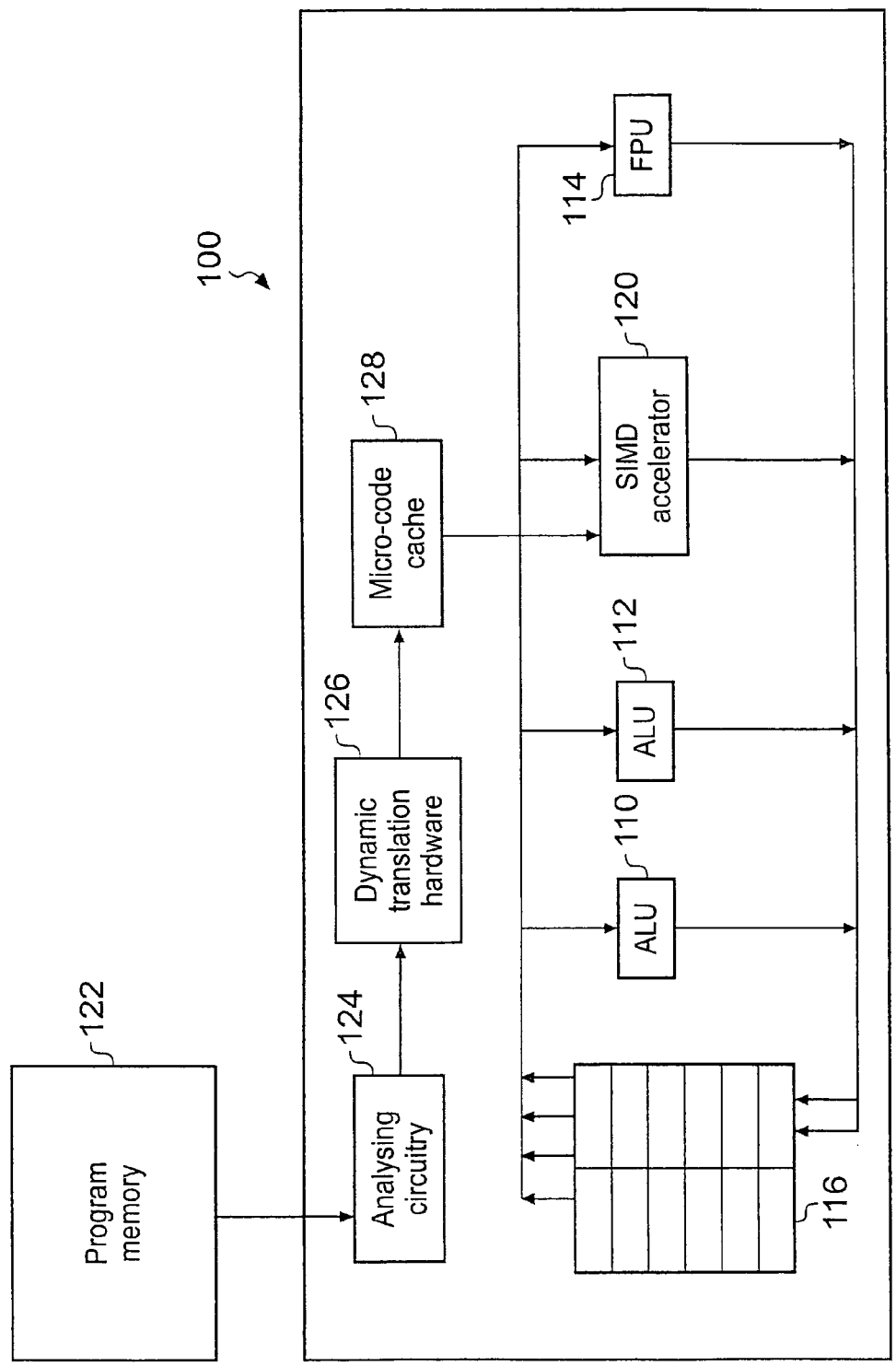
FIG. 1 schematically illustrates a data processing apparatus according to the present technique.

FIG. 1 schematically illustrates a data processing apparatus according to the present technique. The data processing apparatus 100 comprises a first arithmetic logic unit (ALU) 110, a second ALU 112, a floating point unit (FPU) 114, a set of general-purpose registers 116, a SIMD accelerator 120, analysing circuitry 124, dynamic translation hardware 126 and a micro-code cache 128.

The two ALU's 110, 112, the FPU 114 and the SIMD accelerator 120 execute program instructions derived from a program memory 122. The program instructions perform manipulations on data retrieved from the set of registers 116 and the results of those processing operations are written back into the registers 116. Note that for simplicity a single set of registers is shown in FIG. 1, but separate scalar registers and vector registers are in fact provided.

The ALU's 110, 112 and the FPU 114 execute scalar instructions of a scalar instruction set native to the data processing apparatus 100. The SIMD accelerator 120 on the other hand, performs the same computation on multiple data items using a single instruction. The multiple data items are packed into SIMD vectors, which form input operands and ultimately results of the SIMD processing operations. In order to utilise the SIMD accelerator 120, the scalar instruction set of the data processing apparatus 100 is extended with a set of SIMD instructions (or vector instructions). The SIMD instruction set of the data processing apparatus 100 comprise a fixed SIMD width specifying the number of data elements (a single data-element in this particular arrangement has 8-bits) on which the same computation is substantially simultaneously performed. The SIMD instruction set also has a fixed number of SIMD op-codes providing a particular set of SIMD functionality characteristic of the SIMD instruction set. The SIMD accelerator 120 has a SIMD width of 8 and operates on 8-bit data elements. Thus, the SIMD accelerator 120 operates on 64-bit vectors. It will be appreciated that alternative implementations will vary in terms of both the SIMD width and the functionality of the set of SIMD instructions.

Program code from the program memory 122 is supplied to the analysing circuitry 124, which analyses at least a subset of instructions of a section of computer program code from the program memory 122 to identify a SIMD instruction set architecture associated with a given SIMD instruction set architecture. The analysing circuitry 122 replaces these identified SIMD instructions by respective functionally-equivalent scalar representations comprising one or more scalar instructions of the native instruction set of the data processor 100.

For example, a given SIMD instruction that operates on a SIMD vector may be replaced by the analysing circuitry 124 by a scalar loop in which each of the 8 individual data elements of the SIMD vector are operated on sequentially rather than in parallel. Where it is not possible to replace a given SIMD instruction by a simple scalar loop, it is replaced by a predetermined set of scalar instructions (i.e. an "idiom") associated with the identified SIMD instruction. Thus the conversion from SIMD instructions of a first instruction set architecture to scalar instructions native to the data processing apparatus 100 is performed using a set of predefined rules that describe the conversion process. The conversion rules (SIMD instruction to functionally-equivalent scalar representation) are analogous to the syntax of a programming language.

The analysing circuitry in the arrangement of FIG. 1 comprises circuitry that executes operations of a compiler at compile-time. However, in alternative arrangements, the analysing circuitry 124 is circuitry that executes a post-compilation cross-compiler.

The analysing circuitry 124 outputs scalar idioms corresponding to a functionally-equivalent scalar representation of the corresponding input SIMD instruction. The analysing circuitry 124 also serves to mark the functionally equivalent scalar representations of the SIMD instructions so that they can be recognised by the dynamic translation hardware 126. In the embodiment of FIG. 1, the analysing circuitry 124 performs the marking using an auxiliary table stored in memory. The analysing circuitry 124 outputs compiled code (i.e. binary code) and supplies this to the dynamic translation hardware 126.

The dynamic translation hardware 126 executes a state machine that recognises patterns of scalar instructions (i.e. scalar idioms) and transforms them into SIMD equivalents corresponding to a second instruction set architecture appropriate for execution on the SIMD accelerator 120. This enables program code from the program memory 122 comprising SIMD instructions corresponding to a different SIMD architecture from that of the data processing apparatus 100 to be executed thereon. Thus, whilst the analysing circuitry 124 performs a first translation process from a first SIMD architecture to a functionally equivalent scalar representation, the dynamic translation hardware 126 performs a second translation from the functionally equivalent scalar representation back to a SIMD representation corresponding to a different SIMD architecture.

The dynamic translation hardware 126 uses a different set of rules from the analysing circuitry 124 to translate the scalar operations (or idioms) back to the vector operations. However, unlike the SIMD instructions in the original program code, the instructions output by the dynamic translation hardware are bound to the particular SIMD instruction set architecture of the data processing apparatus 100. The set of registers 116 is used to represent both the functionally equivalent scalar representation output by the analysing circuitry 124 and the translated SIMD instructions output by the dynamic translation hardware 126.

The translated SIMD instructions output by the dynamic translation hardware 126 are stored in the micro-code cache 128 for use by the SIMD accelerator 120 when the corresponding functionally equivalent scalar representation is next encountered upon subsequent execution of the relevant portion of program code.

The inclusion of the dynamic translation hardware 126 in the data processing apparatus 100 means that the SIMD accelerator 120 can have its hardware changed (e.g. to extend the SIMD vector width) without having to define the underlined SIMD instruction set and without having to recompile existing applications to run efficiently on the new SIMD architecture. Extending the vector width of the SIMD accelerator 120 would require only updating the dynamic translation hardware 126 to reflect the change. Neither the analysing circuitry 124 (which in this embodiment represents a compiler) nor the existing program code in the program memory 122 need be changed.

Although in the embodiment of FIG. 1, the dynamic translation is performed in hardware 126, in alternative embodiments the dynamic translation is performed at least in part by software.

Figure 2:
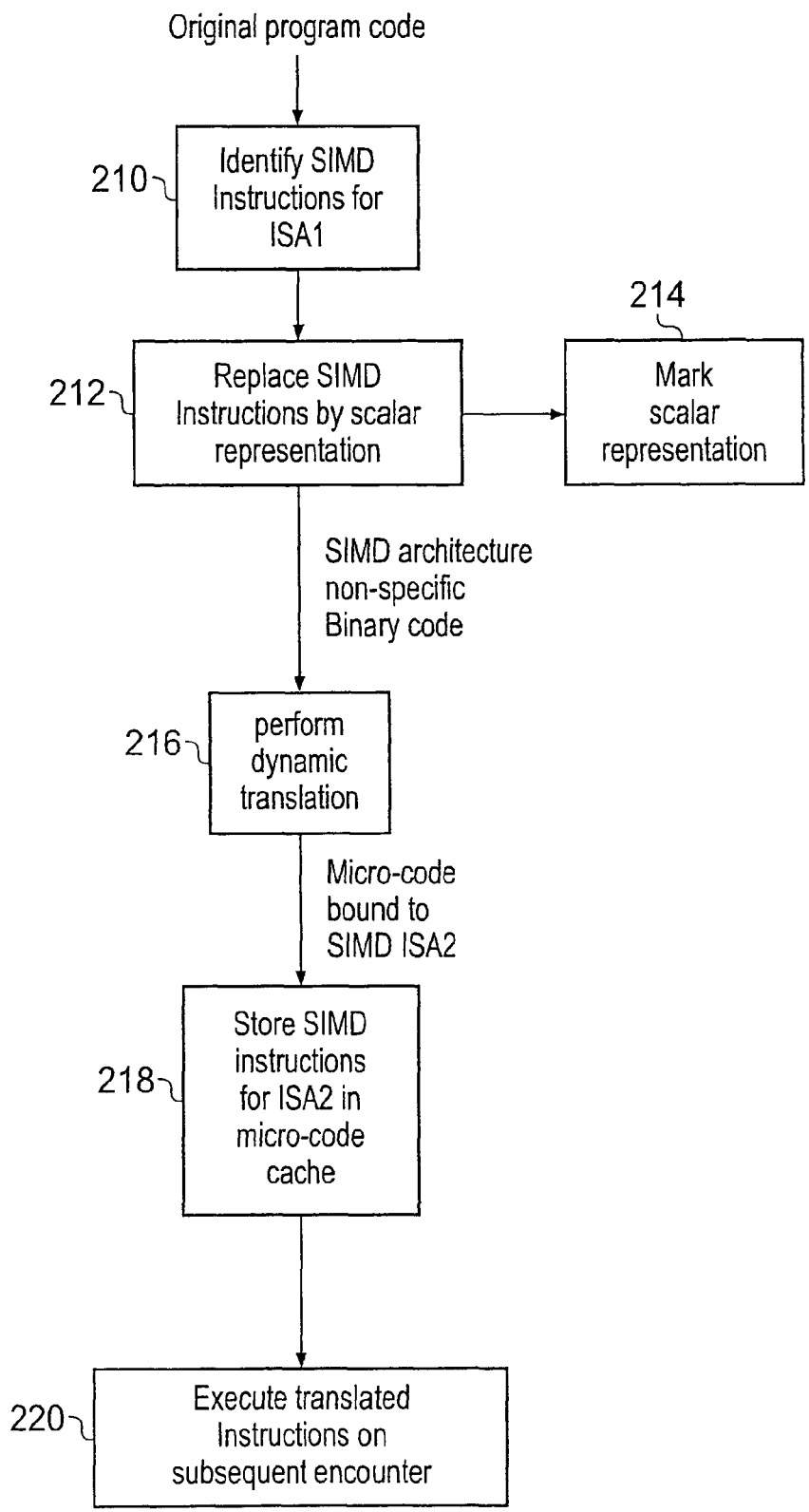
FIG. 2 is a flow chart that schematically illustrates the process of executing SIMD instructions of a first instruction set architecture on the data processing apparatus having a different SIMD instruction set architecture.

FIG. 2 is a flow chart that schematically illustrates the process of executing SIMD instructions of a first instruction set architecture on the data processing apparatus 100 having a different SIMD instruction set architecture.

The process begins at stage 210, where one or more program instructions from program code stored in the program memory 122 are analysed to identify SIMD instructions corresponding to a first instruction set architecture. Next, at stage 212, the identified SIMD instructions are replaced by scalar representations. Functionally-equivalent scalar representations are generated, for example, by converting a given vector instruction to a corresponding scalar loop. Replaced SIMD instructions are also marked such that the scalar representation can be identified in the subsequent dynamic translation stage. The marking is performed at stage 214 in parallel with the translation stage from a first SIMD instruction set architecture to a functionally equivalent scalar representation. In this arrangement the translation 212 and marking 214 are performed by a compiler during compilation of the program code.

The process then proceeds to stage 216, where the dynamic translation is performed. The input to the dynamic translation stage 216 is SIMD architecture non-specific binary code output by stage 212 and 214. The dynamic translation performed at stage 216 is performed in dependence upon a set of translation rules that is used to bind the binary code to a specific SIMD architecture different from the SIMD architecture associated with the input program code. Thus the dynamic translation stage 216 outputs micro-code that is bound to a target SIMD instruction set architecture. This microcode is then stored in the micro-code cache 128 (see FIG. 1) at stage 218. Finally, at stage 220 the translated SIMD instructions (i.e. stored micro-code) are executed upon a subsequent encounter of the corresponding scalar representation in the compiled program code.

Figure 3:
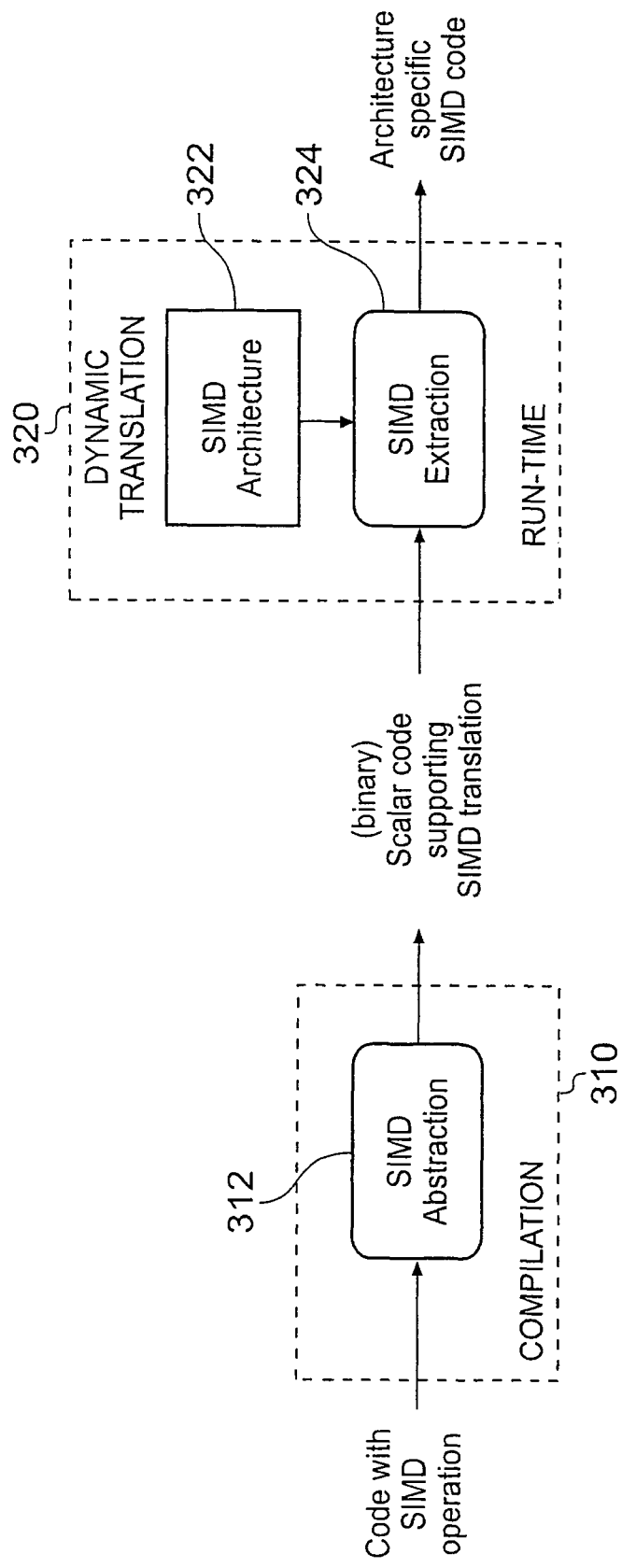
FIG. 3 schematically illustrates two distinct translation stages involved in converting program code corresponding to a first SIMD instruction set architecture to SIMD code corresponding to a second instruction set architecture.

FIG. 3 schematically illustrates two distinct translation stages involved in converting program code corresponding to a first SIMD instruction set architecture to SIMD code corresponding to a second instruction set architecture. The process of FIG. 3 comprises a SIMD abstraction module 312, SIMD architecture information 322 and a SIMD extraction module 324.

The process involves a first translation 310 during a compilation stage whereupon the compiler performs a SIMD abstraction 312 translating the input SIMD instructions to scalar code in binary. The binary code output by the SIMD abstraction module 312 is amenable to SIMD translation to bind it to a chosen one of a wide range of different SIMD architectures. The second translation 320 involves a run-time dynamic translation module 320, in which the SIMD extraction module 324 extracts SIMD instructions from the binary scalar code output by the SIMD abstraction module 312. Information 322 relating to a particular second SIMD instruction set architecture associated with the particular SIMD accelerator 120 on which the program code is to be executed is fed into the SIMD abstraction module 324. The output of the dynamic translation stage 320 is binary architecture-specific SIMD code.

Figure 4:
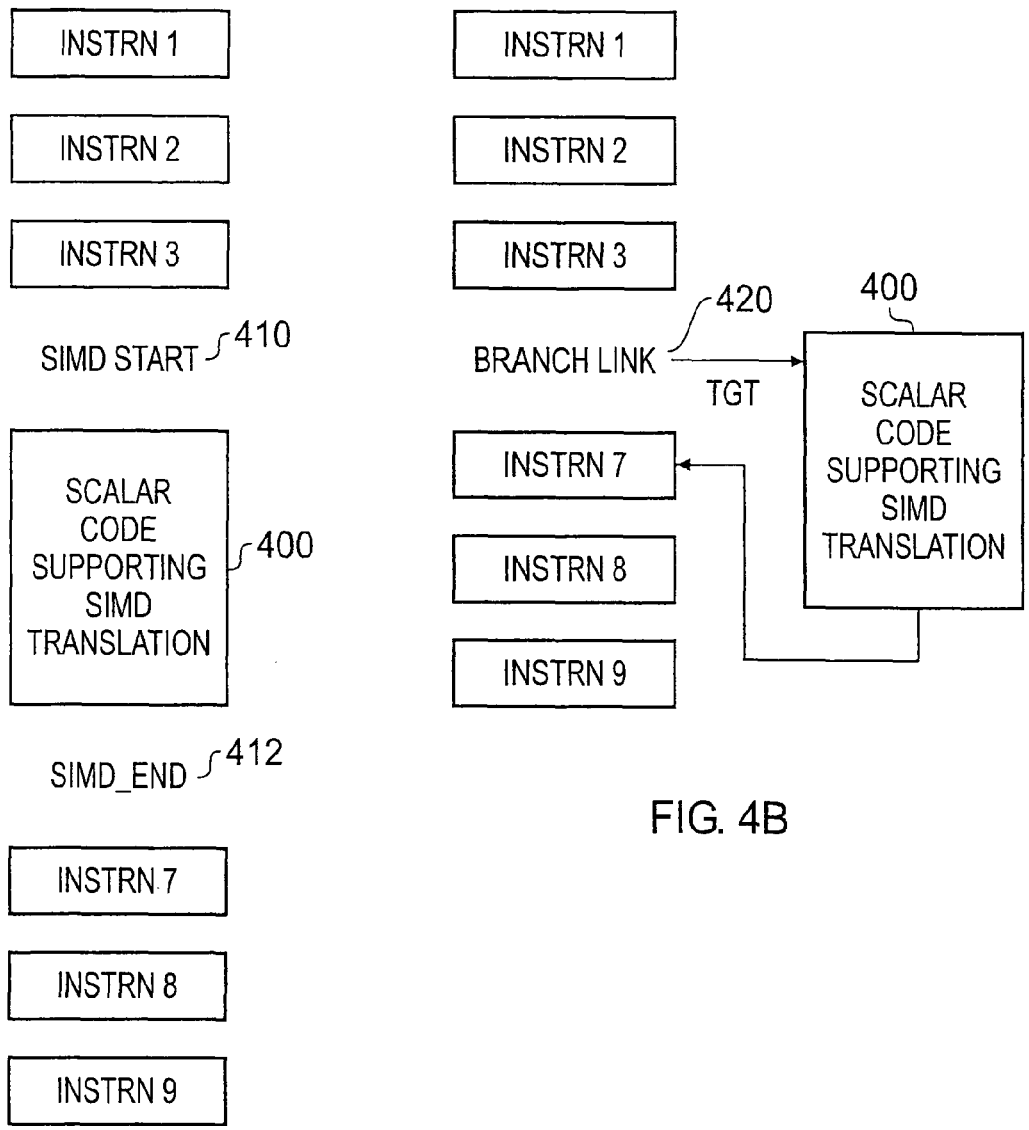
FIGS. 4A and 4B schematically illustrate two alternative methods of marking the functionally-equivalent scalar representations output by the SIMD abstraction module of FIG. 3.

FIGS. 4A and 4B schematically illustrate two alternative methods of marking the functionally-equivalent scalar representations output by the SIMD abstraction module 312 of FIG. 3 (or the analysing circuitry 124 of FIG. 1). FIGS. 4A and 4B schematically illustrate a series of instructions in binary form.

In FIG. 4A, the analysing circuitry 124 (see FIG. 1) marks a functionally equivalent scalar representation 400 of an instruction or group of instructions using special-purpose instructions SIMD_START 410 and SIMD_END 412. In this case, instructions 1 to 3 and 7 to 9 are un-translated scalar instructions for execution on the scalar processing circuitry of FIG. 1, whereas the scalar code block 400 is destined for execution on the SIMD accelerator 120 following translation and binding to the appropriate SIMD instruction set architecture.

FIG. 4B schematically illustrates a second embodiment of the analysing circuitry 124 of FIG. 1, in which the functionally equivalent scalar representation 400 of an input SIMD instruction is marked in the binary code by a branch-and-link instruction and a return instruction. The target of the branch link instruction 420 is the functionally equivalent scalar representation 400 and the return instruction is used to return the execution flow to instruction 7, which is executed by the scalar processing circuitry. In a further alternative arrangement, the functionally equivalent scalar representation 400 is identified by storing a mapping in an auxiliary table in memory.

Figure 13:
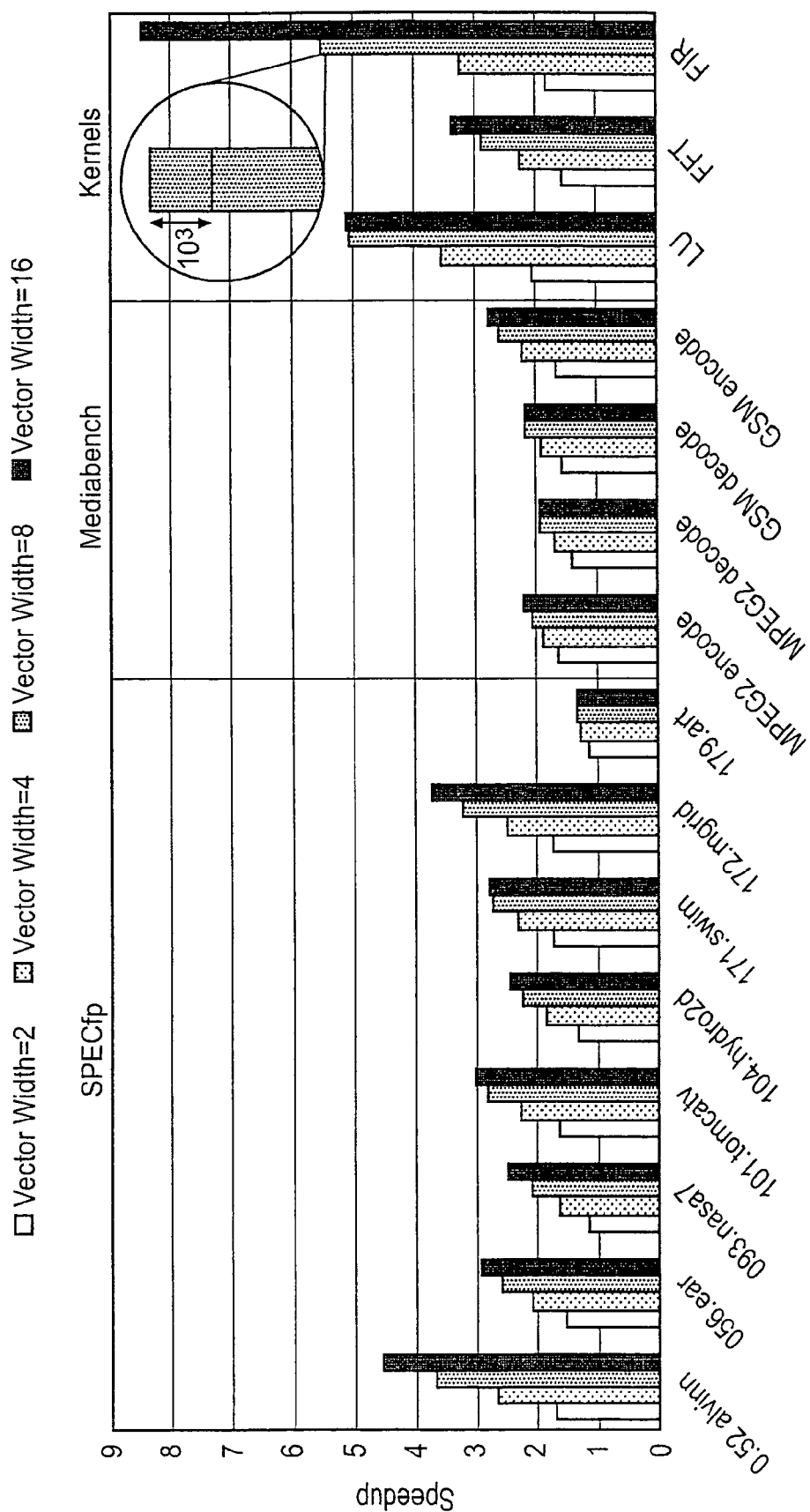
FIG. 13 schematically illustrates simulation results showing speedup for a number of benchmarks for different vector widths relative to a processor without SIMD acceleration.

In the description of FIGS. 5 to 13 below, the following aspects of the present technique will each be outlined:
- a compiler/translation framework for decoupling the SIMD hardware implementation from the Instruction Set Architecture (ISA).
- a simple, ISA-independent mechanism for expressing SIMD width-independent SIMD translation opportunities to a translator.
- an example design and implementation of a lightweight dynamic translator capable of generating SIMD code at runtime (described with reference to FIG. 9).
- simulation results evaluating the effectiveness of the present technique are presented in FIGS. 12A, 12B and 13 to illustrate exploitation of different SIMD accelerators, the runtime overhead of SIMD translation, and any costs incurred from dynamic translation.

Embodiments of the present invention allow the instruction set to be decoupled from the SIMD accelerator hardware by expressing SIMD optimization opportunities using the processor's baseline instruction set. Expressing SIMD instructions using the baseline instruction set provides an abstract software interface for the SIMD accelerators, which is utilized through a lightweight dynamic translator 126 (see FIG. 1). This lessens the development costs of the SIMD accelerators and provides binary compatibility across hardware and software generations.

As shown in FIG. 3, there are two phases involved in decoupling SIMD accelerators from the processor's instruction set. First, an offline phase 310 takes SIMD instructions and maps them to an equivalent representation. Second, a dynamic translation phase 320 turns the scalar representation back into architecture specific SIMD equivalents.

Converting SIMD instructions into an equivalent scalar representation (as performed by SIMD abstraction module 312 of FIG. 3) requires a set of rules that describe the conversion process, analogous to the syntax of a programming language. The conversion can either be done at compile time or by using a post-compilation cross compiler. It is important to note that the SIMD-to-scalar conversion is completely orthogonal to automated SIMDization (i.e., conversion can be done in conjunction with compiler-automated SIMD code or with hand coded assembly). Further, no information is lost during this conversion. The resulting scalar code is functionally equivalent to the input SIMD code, and a dynamic translator is able to recover the SIMD version provided it understands the conversion rules used.

Dynamic translation (stage 320 of FIG. 3) converts the virtualized SIMD code (i.e., the scalar representation) into processor-specific SIMD instructions. This can be accomplished using binary translation, just-in-time compilation (JITs), or hardware. Offline binary translation is undesirable for three reasons. First, there is a lack of transparency; user or OS intervention is needed to translate the binary. Second, it requires multiple copies of the binary to be kept. Lastly, there is an accountability issue when applications break since it is difficult to determine whether the application developer or the translator is at fault.

JITs or virtual machines are more viable options for dynamic translation. However, in the described embodiments the dynamic translator is implemented using hardware (see FIG. 9). One main benefit of hardware-based translation over JITs is that it is more efficient than software approaches. It can be shown that that the translation hardware is off the processor's critical path and takes less than 0.2 mm$^2$ of die area. Additionally, hardware translation does not require a separate translation process to share the CPU, which may be unacceptable in embedded systems. However, nothing about our virtualization technique precludes software-based translation.

Figure 5:
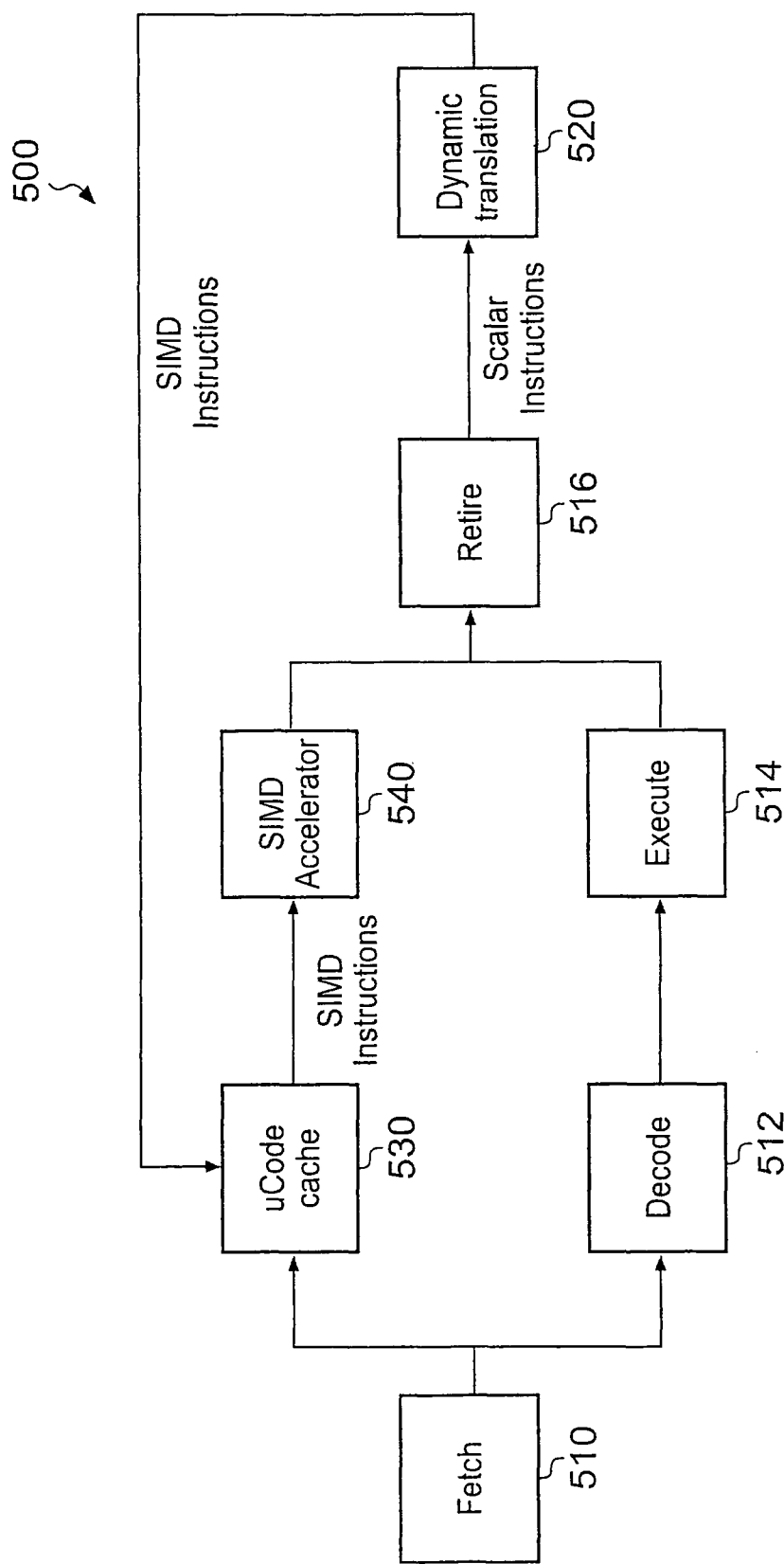
FIG. 5 schematically illustrates a pipelined processor having a post-retirement dynamic translator.

FIG. 5 schematically illustrates a pipelined processor 500 augmented with a SIMD accelerator 540, post-retirement dynamic translator 520, and a microcode cache 530 that stores recently translated SIMD instructions. The basic pipeline processor comprises a fetch stage 510, a decode stage 512, an execute stage 514 and a retire stage 516. This system provides high-performance for data parallel operations without requiring instruction set modifications or sacrificing binary compatibility.

Embodiments of the present invention that will be described herein do not use any techniques that rely on the compiler to automatically SIMDize a program. However, the approach of the present technique can be used in conjunction with automatic SIMDization techniques as described in the following publications:

A. J. C. Bik, M. Girkar, P. M. Grey, and X. Tian. Automatic intraregister vectorization for the intel architecture. International Journal of Parallel Programming, 30(2): 65-98, 2002;

A. E. Eichenberger, P. Wu, and K. O'Brien. Vectorization for simd architectures with alignment constraints. In Proc. of the SIGPLAN '04 Conference on Programming Language Design and Implementation, pages 82-93, 2004;

A. Krall and S. Lelait. Compilation techniques for multimedia processors. International Journal of Parallel Programming, 28(4):347-361, 2000;

S. Larsen, R. Rabbah, and S. Amarasinghe. Exploiting vector parallelism in software pipelined loops. In Proc. of the 38th Annual International Symposium on Microarchitecture, pages 119-129, 2005;

P. Wu, A. E. Eichenberger, and A. Wang. Efficient simd code generation for runtime alignment and length conversion. In Proc. of the 2005 International Symposium on Code Generation and Optimization, pages 153-164, 2005.

However, this is not the main focus of the present technique. Instead, the focus is on how to design a scalar representation of SIMD code, which executes correctly on a baseline processor, and is amenable to runtime translation.

Before describing the actual strategy for abstraction, it is important to explicitly state some assumptions about the hardware targeted and applications to be run. First, it is assumed that the targeted SIMD accelerators (such as accelerator 540 of FIG. 5) operate as a separate pipeline. That is, the SIMD accelerator shares an instruction stream and front end with a baseline pipeline, but has separate register files and execution units.

Second, it is assumed that the SIMD accelerator uses a memory-to-memory interface. That is, when executing SIMD instructions, the basic sequence of events is a loop that loads vectors, operates on them, and finally stores the vectors back to memory. In this model, there is no register-to-register communication between the scalar register file and the vector register file, and intermediate data not stored to memory is not accessed by successive loops. The assumption that there is little register-to-register communication is validated by production SIMD accelerators, which usually have either very slow or no direct communication between the two register files. The lack of intermediate data communication between loops is a side-effect of the types of loops being optimized; typically the ideal size of a vector, from the software perspective, is much too large to fit into the hardware vector size. For example, one of the hot loops in the "171.swim" application in the graph of FIG. 13 described below operates on vectors of size 514. If hardware supported vectors that long, then computed results could be passed between successive loops in a register. Since the results do not fit in hardware, the results have to be passed through memory.

A last assumption is that the application should be compiled to some maximum vectorizable length. That is, even though the binary will be dynamically adjusted based on the vector width supported in the hardware, there is some maximum vector width supported by the binary. The reason for this assumption is due to memory alignment. Most SIMD systems restrict memory accesses to be aligned based on their vector length. To enforce such alignment restrictions, the compiler aligns data based on an assumed maximum width. The binary can be dynamically adjusted to target any width less than the maximum. The trade off here is code size may unnecessarily increase if an accelerator supports narrower widths than the assumed vector size. I Implicit in this alignment restriction is the assumption that targeted accelerators only support execution widths that are a power of 2 (i.e., 2, 4, 8, . . . ). That is, a binary compiled for maximum vector width of 8 could not (easily) be dynamically translated to run on a 3-wide SIMD accelerator, because data would be aligned at 8 element boundaries in the binary. Assuming SIMD accelerators are power-of-2 widths is certainly valid for the majority of SIMD accelerators in use today.

With these assumptions in mind, we now discuss how to convert SIMD instructions into an equivalent scalar representation. FIG. 6 shows a table that schematically illustrates an example set of conversion rules for the SIMD abstraction process 312 of FIG. 3. The rules specify how SIMD instructions of a first type are converted to an appropriate functionally-equivalent scalar representation. FIGS. 7A,B and 8A,B (described below) demonstrate the usage of the rules of the FIG. 6 table in a detailed example.

The most natural way to express SIMD operations using scalar instructions is by creating a scalar loop that processes one element of the SIMD vector per iteration. Since SIMD accelerators have a memory-memory interface, vector loads can be converted to scalar loads using the loop's induction variable to select a vector element. The size of a vector's elements is derived from the type of scalar load used to read the vector (e.g., load-byte means the vector is composed of 8-bit elements). Similar to memory accesses, data parallel SIMD operations can be represented with one or more scalar instructions that perform the same computation on one element of the vector. Essentially, any data parallel SIMD instruction can be converted to scalar code by operating on one element of the SIMD vector at a time.

If any SIMD operation does not have a scalar equivalent (e.g., many SIMD ISAs but few scalar ISAs support saturating arithmetic), then the scalar equivalent can be constructed using an idiom consisting of multiple scalar instructions. For example, 8-bit saturating addition can be expressed in the ARM scalar ISA as r1=add r2, r3; cmp r1, 0xFF; movgt r1, 0xFF, where the move instruction is predicated on the comparison. Vector masks or element-specific predication, is another common example of a SIMD instruction that would likely be constructed using idioms. The dynamic translator 520 of FIG. 5 can recognize that these sequences of scalar instructions represent one SIMD instruction, and no efficiency is lost in the dynamically translated code. Again, the scalar instruction set is Turing-complete, so any data parallel SIMD instruction can be represented using scalar instructions. The only downside is potentially less efficient scalar code if no dynamic translator is present in the system. The challenge is finding a representation that is easy to convert back to SIMD and is also relatively efficient in its scalar form.

More complicated SIMD instructions, which operate on all vector elements to produce one result (e.g., max, min, and sum) are represented using a loop-carried register in the scalar loop. For example, category (4) in the table of FIG. 6 shows how a vector "min" is represented in this particular arrangement. If the result register is used both as a source and destination operand, and no other operation defines r1 in the loop, then r1 will accumulate the minimum of each vector element loaded into r2. The dynamic translator can easily keep track of which registers hold loop-carried state, such as r1 in this example, meaning vector operations that generate a scalar value fit into the system.

One difficulty in using a scalar loop representation of SIMD instructions is handling operations that change the order of vector elements. Permutation instructions illustrate this problem well. Suppose a loop is constructed and begins operating on the first element of two SIMD vectors. After several data parallel instructions, a permutation reorders the vector elements. This means that the scalar data that was being operated on in one loop iteration is needed in a different iteration. Likewise, the permutation causes scalar data from future (or past) iterations to be needed in the current iteration.

To overcome this problem, according to embodiments of the invention, permutation instructions are arranged to only occur at memory boundaries of scalar loops. This allows the reordering to occur by using loads or stores with a combination of the induction variable and some statically defined offset. Essentially, this loads the correct element for each iteration. The last two rows of the table of FIG. 6 briefly illustrate how reordering at memory boundaries works. In category (7), a butterfly instruction reorders the elements of v2. In order for the scalar loop to operate on the correct element each iteration, the induction variable needs to be modified by an offset, based on what type of permutation is being performed. The compiler creates a read-only array, "bfly", that holds these offsets. Once the offset is added to the induction variable, the scalar load will bring in the appropriate vector element. A dynamic translator uses the offsets to identify what type of permutation instruction is being executed in the scalar equivalent. Offsets are used, as opposed to absolute numbers, to ensure vector width independence of the scalar representation.

The downside of using offsets to represent permutations is that element reordering operations must occur at scalar loop boundaries using a memory-memory interface. This makes the code inherently less efficient than standard SIMD instruction sets, which can perform this operation in registers.

Using only the rules of the table of FIG. 6 and simple idiom extensions, the vast majority of the ARM Neon SIMD instruction set (see M. Baron. Cortex-A8: High speed, low power. Microprocessor Report, 11(14):1-6, 2005) can be expressed using the scalar ARM ISA. Neon is a fairly generic SIMD instruction set, meaning the techniques developed here are certainly applicable to a wide variety of other architectures.

Although using the scalar representation illustrated by the table of FIG. 6 has many benefits, there are some drawbacks that must be taken into consideration. The most obvious is that virtualized SIMD code may not be as efficient on scalar processors as code compiled directly for a scalar processor. This is primarily because of the memory-to-memory interface, the lack of loop unrolling, and the use of idioms. Performance overhead is likely to be minimal, though, since vectors in the working set will be cache hits, the loop branch is easy to predict, and the idioms used are likely to be the most efficient scalar implementation of a given computation. Another mitigating factor is that the scalar code can be scheduled at the idiom granularity to make the untranslated code as efficient as possible. As long as the idioms are intact, the dynamic translator will be able to recover the SIMD code.

Another potential drawback of the proposed virtualization technique is increased register pressure. Register pressure increases because the scalar registers are being used to represent both scalars and vectors in the virtual format. Additionally, temporary registers are needed for some of the proposed idioms. This could potentially cause spill code which degrades performance of both the scalar representation and translated SIMD code. However empirically in the simulations described below with reference to FIG. 13, register pressure was not a problem in the benchmarks evaluated.

A last limitation is that there are two classes of instructions, from ARM's Neon ISA, which are not handled by the proposed scalar representation. One such instruction is v1=VTBL v2, v3. In the VTBL instruction, each element of v2 contains as an index for an element of v3 to write into v1. For example, if the first element of v2 was 3, then the third element of v3 would be written into the first element of v1. This is difficult to represent in the proposed scalar representation, because the induction variable offset, which defines what vector elements are needed in the current loop iteration, is not known until runtime. All other permutation instructions in Neon define this offset statically, allowing the compiler to insert a read-only offset array in the code.

The second class of unsupported instructions is interleaved memory accesses. Interleaving provides an efficient way to split one memory access across multiple destination registers, or to write one register value into strided memory locations. This is primarily used to aggregate/disseminate structure fields, which are not consecutive in memory. There is no scalar equivalent for interleaved memory accesses, and equivalent idioms are quite complex. The performance of certain applications will undoubtedly suffer from not supporting these two classes. None of the benchmarks evaluated utilized these instructions, though, meaning the most important SIMD instructions are supported by the proposed scalar representation.

Figure 7B:
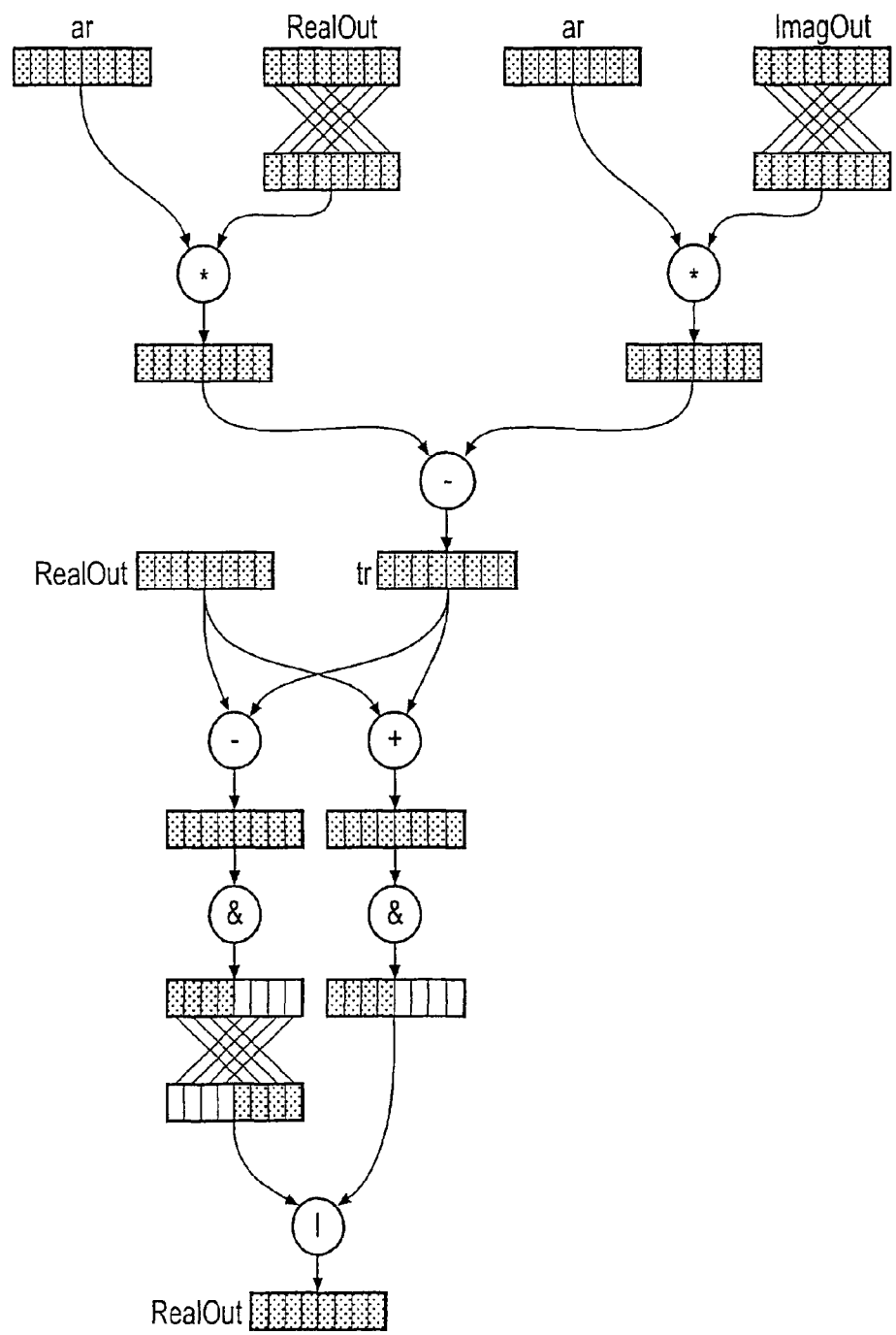
FIG. 7B schematically illustrates the SIMD vector operations performed by the program instructions of FIG. 7A.

FIG. 7A is a section of program code corresponding to a Fast Fourier Transform (FFT) kernel having SIMD instructions corresponding to a first SIMD instruction set architecture and suitable for translation to a functionally-equivalent scalar representation. FIG. 7B schematically illustrates the SIMD vector operations performed by the program instructions of FIG. 7A. The code of FIG. 7A involves a nested loop, where each iteration of the inner loop operates on eight elements of floating point data stored as arrays in memory. This is graphically illustrated in FIG. 7B. The compiler identifies that these operations are suitable for SIMD optimization and generates vector load instructions for each eight element data segment. The compiler then schedules vector operations for the loaded data so that the entire inner loop may be executed as a small sequence of SIMD operations, shown in FIG. 8A.

Figures 8A, 8B:
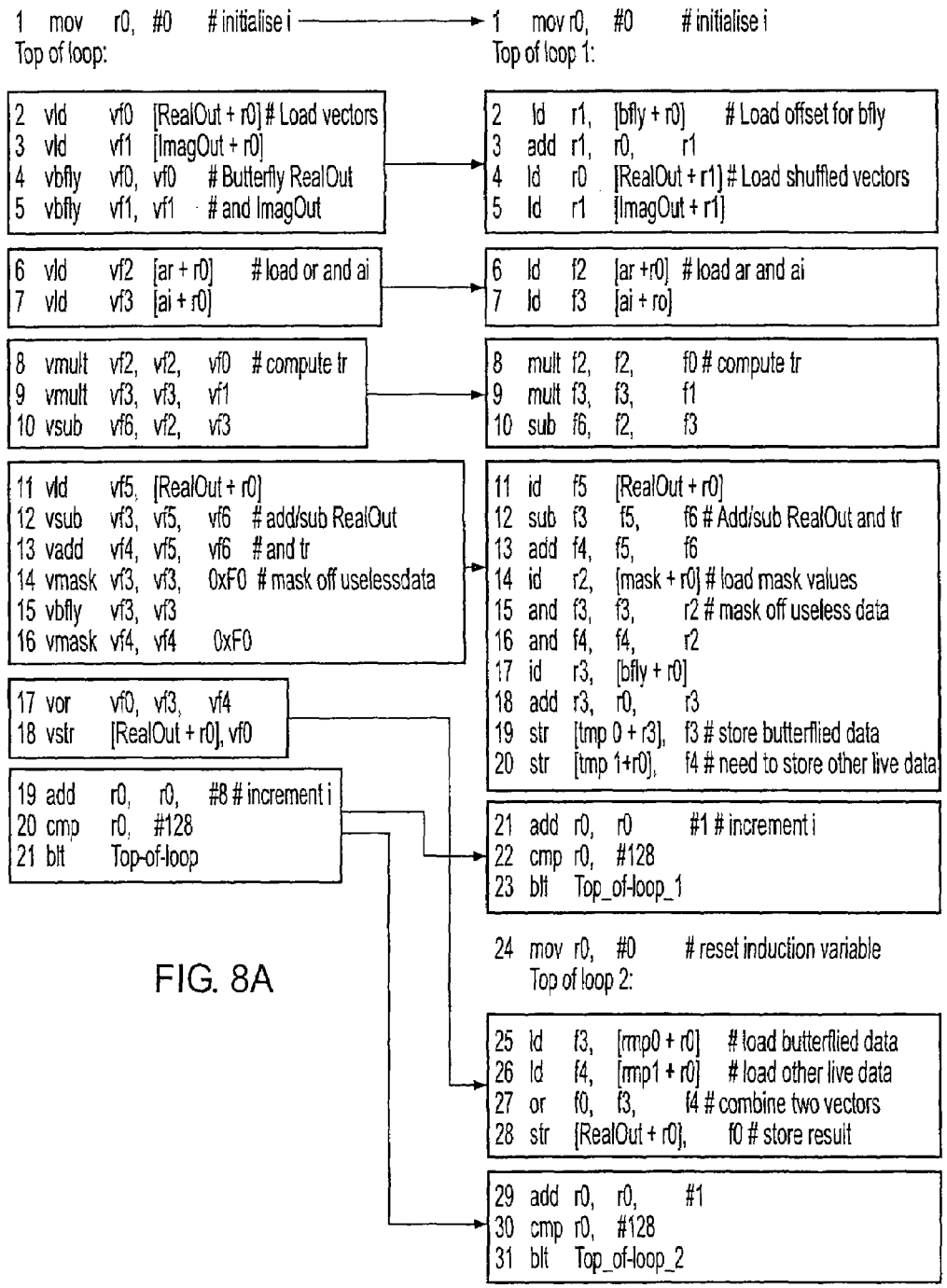
FIG. 8A schematically illustrates SIMD code corresponding to the FFT algorithm of FIG. 7A.
FIG. 8B schematically illustrates code comprising functionally-equivalent scalar representations of the SIMD code of FIG. 8A.

FIG. 8A schematically illustrates SIMD code corresponding to the FFT algorithm of FIG. 7A. FIG. 8B schematically illustrates code comprising functionally-equivalent scalar representations of the SIMD code of FIG. 8A, generated by the SIMD abstraction module 312 of FIG. 3.

FIG. 8B presents the scalar mapping of the SIMD code from FIGS. 7 and 8A. Here, the vector operations of the SIMD loop are converted into a series of sequential operations, and the increment amount of the induction variable is decreased from eight to one, essentially converting each eight element operation into a single scalar operation. The vector load and butterfly instructions in lines 2-5 of the SIMD code are converted into a set of address calculations and load instructions in lines 2-5 of the scalar code. As previously mentioned, SIMD permutation operations are converted into scalar operations by generating a constant array of offset values added to the loop's induction variable. These offsets are stored in the static data segment of the program at the label bfly. The value stored at the address bfly plus the induction variable value is the offset of the element of the data array to be loaded in the current iteration.

Most of the vector operations from the SIMD code in lines 6-18 are data parallel, and simply map to their scalar equivalent operation (e.g., the vmult on SIMD line 8 is converted to a mult on scalar line 8). However, there are a few considerations that need to be made for non-parallel operations. Note that the operation on line 17 of the SIMD code requires that all of the values in vf3 be computed before the OR operation, because the "vbfly" operation in line 15 exchanges the position of the first and last vector element. In order to properly transform this code segment into a set of scalar instructions, the loop body for the scalar code must be terminated early, and the operands to the or operation must be calculated and stored in a temporary location at the end of each loop iteration, as shown in lines 18-19 of the scalar code. Then, a second loop is created (lines 24-30) that performs the serial or operation across each element of data. By separating scalar equivalents in different loops, the compiler essentially performs a loop fission optimization to ensure that certain SIMD operations are fully completed before others in the next loop are started.

Once the SIMD instructions are translated into scalar code, the compiler needs some way to identify to the translator that these portions of code are translatable. Two examples of appropriate marking techniques have been described above with reference to FIGS. 4A and 4B. One way of performing the marking is by outlining the code segment as a function. The scalar equivalent code is surrounded by a branch-and-link and a return instruction so that the dynamic translator is notified that a particular region of code has potential for SIMD optimization.

In the hardware-based translation scheme according to the present technique (implemented by the dynamic translator of FIG. 9 described below), when a scalar region is translated into SIMD instructions, the SIMD code is stored in the microcode cache (item 128 in FIG. 1), and the branch-and-link is marked in a table in the processor's front-end. The next time this branch is encountered, the front end can utilize the SIMD accelerator by simply accessing the SIMD instructions in the microcode cache and ignoring the branch. This allows a processor to take advantage of SIMD accelerators without explicit instruction-set modifications.

One potential problem with marking translatable code regions by function calls is false positives. This happens if the dynamic translator creates SIMD code for a function that was not meant to be SIMDized. Typically, this is not a problem. ABIs require that functions have a very specific format, which does not match the outlined function format described for scalarized loops. Therefore, the dynamic translator would not be able to convert most non-translatable functions. Even if the translator was able to convert a function that it was not meant to, the SIMD code would be functionally correct as long as there were no memory dependences between scalar loop iterations. The dynamic translator 126 of FIG. 1 is simply converting between functionally equivalent representations. The scenario of a false positive that produces incorrect code is highly unlikely, but one way to increase the likelihood of correctness is to mark the outlined functions in some unique way (e.g., a new branch-and-link instruction that is only used for translatable regions).

Having defined a software abstraction for describing SIMD instructions using a scalar ISA as in the table of conversion rules of FIG. 6, a runtime method is required for translating them back into SIMD instructions in the dynamic translator 126 of FIG. 1. As previously mentioned, there are many valid ways to do this: in hardware at decode time, in hardware after instruction retirement, or through virtual machines or JITs. The software abstraction presented in the previous section is independent of the translation scheme.

The dynamic translator 520 of FIG. 5 is a post-retirement hardware translator. Hardware was chosen because the implementation is simple, it adds little overhead to the baseline processor, and hardware is more efficient than software. Post-tretirement hardware was chosen, instead of decode time, because post-retirement is far off the critical path of the processor. The experimental results described below with reference to FIG. 13 have demonstrated that post-retirement dynamic translations of program code can be hundreds of cycles long without significantly affecting performance. In the arrangement of FIG. 5, which uses post-retirement dynamic mapping, the modified microcode needs is stored in a cache 530 and inserted into the control stream in the pipeline front-end.

Figure 9:
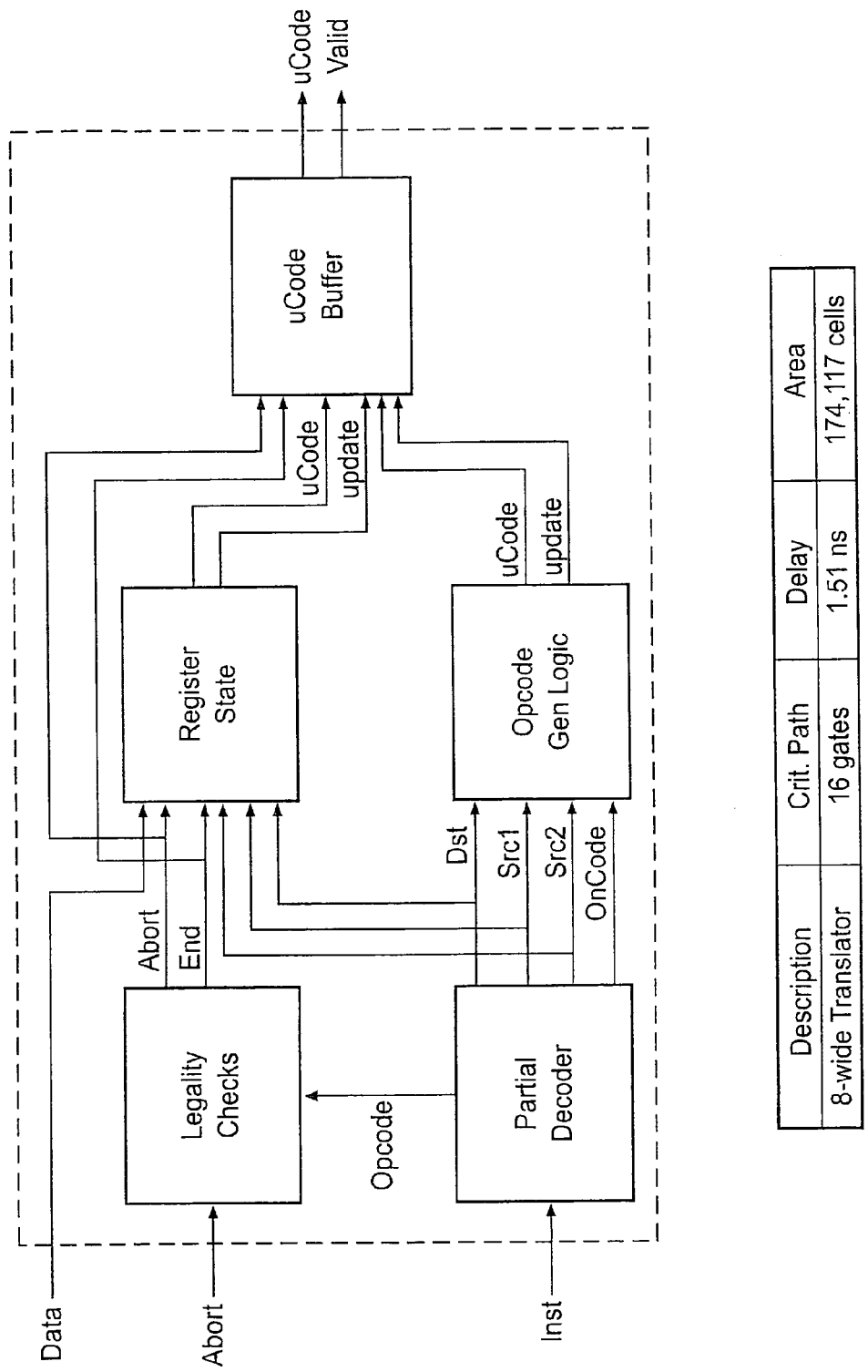
FIG. 9 schematically illustrates hardware dynamic translation circuitry according to the present technique.

FIG. 9 schematically illustrates hardware dynamic translation circuitry 900 according to the present technique. The circuitry comprises: a partial decoder 910; legality checking circuitry 920; register state circuitry 930; opcode generation circuitry 940 and a micro-code buffer 950.

From a high level, the dynamic translator 900 is essentially a hardware realization of a deterministic finite automaton that recognizes patterns of scalar instructions to be transformed into SIMD equivalents. Developing automata (or state machines) to recognize patterns, such as the patterns in the table of FIG. 6, is a mature area of compiler research. A thorough discussion of how to construct such an automata is described in "Compilers: Principles, Techniques, and Tools", A. Aho, R. Sethi, and J. Ullman, Addison-Wesley, Reading, Mass., 1986.

The structure of the post-retirement dynamic translator is shown in FIG. 9. To prove the practicality of this structure, it was implemented in HDL (targeting the ARM ISA with Neon SIMD extensions) and synthesized using a 90 nm IBM standard cell process. The results of the synthesis are shown in the table of FIG. 9. Notice that the control generator runs at over 650 MHz, and takes up only 174,000 cells (less than 0.2 mm2 in 90 nm), without using any custom logic. This shows that the hardware impact of the control generator is well within the reach of many modern architectures.

We shall now consider in turn each of the components of the dynamic translator 900.

Partial Decoder 910: The dynamic translator has three inputs from retirement of the baseline pipeline: the instruction that retires (Inst in the figure), the data value that instruction generated (Data), and an abort signal (Abort). Initially, the retired instruction is fed into a partial decoder to determine the source/destination operands and the opcode. It is only a partial decoder, because it only needs to recognize opcodes that are translatable; any other opcodes simply cause translation to abort mapping of the outlined function. This portion of the control generator is potentially redundant, depending on the micro-architecture, because the retiring instruction will likely have the opcode and operand information stored in its pipeline latch. Overall, the partial decoder only takes a few thousand cells of die area, so it does not contribute significantly to the area overhead; it is responsible for 5 of the 16 gates in the critical path, though.

Legality Checking circuitry 920: The purpose of the legality checking circuitry 920 in the dynamic translator 900 is to monitor the incoming instructions to ensure that they can be translated. Scalar instructions that do not map to a SIMD equivalent generate an abort signal that flushes stateful portions of dynamic translator. In addition to an instruction generated abort signal, there is an abort signal from the base pipeline to stop translation in the event of a context switch or other interrupt. The legality checking circuitry 920 also signals when a subgraph has finished mapping, enabling the microcode buffer to write the translated SIMD instructions into the microcode cache. The legality checks only comprise a few hundred cells and do not occur on the critical path.

Register State circuitry 930: After the instruction is decoded, the operands/opcode access some state, which is indexed based on the register numbers. This register state determines the translation strategy for this instruction. Register state also includes whether or not a register represents a scalar or vector, the size of the data currently assigned to the register (e.g., 16 or 32 bit), and previous values stored in the register. The opcode and register state comprise the data used to transition between states in the automata.

Overall, there are 56 bits of state per register and a large number of MUXes in the register state module, making this structure comprise 55% of the control generator die area. Since the ARM ISA only has 16 architectural integer registers, 55% of the die area is likely proportionally smaller than dynamic translators targeting architectures with more registers. Additionally, this structure will increase in area linearly with the vector lengths of the targeted accelerator. The previous values assigned to each register are stored in the register state in order to identify operations that are defined using offsets in memory (e.g., the butterfly instruction discussed in Section 3). Recall that instructions that reorder elements within a vector are encoded by loading an offset vector, adding the offsets to the induction variable, and using that result for a memory access. In the dynamic translator 900, load instructions cause the data to be written to the destination register's state. When a data processing instruction uses that destination register as a source operand, (e.g., to add those values to the induction variable), then the previous values of the address are copied to the data processing instruction's destination register state. When a memory access instruction uses a source that has previous values recorded in the register state, this signals that a shuffle may be occurring. Those previous values (i.e., the offset vector) are used to index a content addressable memory (CAM), and if there is a hit, the appropriate shuffle is inserted into the SIMD instruction stream. If the CAM misses, then the offset being loaded is a shuffle not supported in the SIMD accelerator and translation is aborted. Note that storing the entire 32 bits of previous values is unnecessary, because the values are only used to determine valid constants, masks, and permutation offsets; numbers that are too big to represent simply abort the translation process. The process of reading a source register's previous values, and conditionally writing them to the destination register, accounts for 11 of the 16 gates on the critical path.

Opcode Generation circuitry 940: Once register state for an instruction's source operands has been accessed, it is passed to the opcode generation logic. Opcode generation logic uses simple combinational logic to determine how to modify an opcode based on the operands. This essentially performs the reverse of the mapping described above with reference to the table of FIG. 6. Translation rules for performing the mapping from the functionally-equivalent scalar representation to SIMD code corresponding to the target SIMD instruction set architecture (corresponding to the SIMD accelerator on which it is to be executed) are shown in the table of FIG. 10. In the FIG. 10 table "vdp" refers to any data processing opcpde and "vred" refers to a vector opcode that reduces a vector to one scalr result (e.g, min).

For example, if the incoming instruction is a scalar load "ld", then the opcode logic will write a vector load "vld" into the microcode buffer and tell the register state to mark the destination as a vector. Likewise, if the incoming instruction is an add, and the register state says both source registers are vectors, opcode generation logic will write a vector add into the microcode buffer and mark the destination register as a vector. A small amount of state is kept alongside this logic to recognize idioms of scalar instructions. Whenever an idiom is detected, this logic has the ability to invalidate previously generated instructions in the microcode buffer.

The opcode generation circuitry 940 is fairly simple provided the SIMD instruction format is similar to the equivalent scalar instructions, since the scalar instructions require little modification before insertion into the microcode buffer. This is the case with our implementation, and thus the logic only takes up approximately 9000 cells. Control generation is not on the critical path in the current implementation, but it is very close to being critical. It likely would be on the critical path if there was not good correlation between baseline and SIMD instruction formats.

Microcode Buffer 950: The final component of the dynamic translator 900 is the microcode buffer 950. This is primarily just a register array used to store the SIMD instructions until a region of scalar code has completed mapping. The maximum length of a microcode sequence was limited to 64 instructions in this implementation. This is sufficient for the benchmarks examined below with reference to FIG. 13. At 32 bits per instruction, the microcode buffer contains 256 bytes of memory, which accounts for a little more than half of its 77,000 cells of die area. The rest of the area is consumed by an alignment network for collapsing instructions when idioms or permutations invalidate previously generated instructions.

Recall that the register state is used to detect when memory operations are indexed using a previously loaded offsets from constant arrays (Categories (7) and (8) in the table of FIG. 6). When this situation is detected, the opcode generation circuitry 940 inserts the appropriate permutation and memory instructions. At this point, the previously generated vector load of the offset vector can safely be removed. Removing this instruction while inserting multiple other instructions may require an alignment network. It should be noted that removing the offset load is not strictly necessary for correctness, and eliminating this functionality would be likely to simplify the microcode buffer.

After the microcode buffer receives the End signal from the legality checking circuitry 920, SIMD instructions are written into the microcode cache 530 (see FIG. 5). SIMD code will then be inserted into the pipeline upon subsequent executions of the outlined function.

To better illustrate how the dynamic translation hardware of FIG. 9 functions, the table of FIG. 11 shows an example, involving translating the scalar loop in FIG. 8B back into SIMD instructions for an 8-wide SIMD accelerator. The second loop from FIG. 8B would be translated in a similar manner, and not re-fused with the original fissioned loop. Translation is very straightforward for the vast majority of opcodes in the example, making the design of a hardware dynamic translator 900 simple.

Instruction 1, the move, is the first instruction to enter the dynamic translator 900. As per the rules in FIG. 10, r0 is marked as the induction variable in the register state, and the instruction is inserted into the microcode buffer 950 unmodified.

Next, instruction 2 is translated. This is a load based on a scalar (the address bfly) and the induction variable (r0). FIG. 10 shows this is translated into a standard vector load. R1 is marked as a vector and the value loaded is stored as a previous value of r1 in the register state. After that, instruction 3 is translated. The register state shows that r0 is the induction variable and r1 is a vector with previous values associated with it. This instruction generates no instruction.

Now instruction 4 needs to be translated. Since one of the sources, r1, has previous values associated with it, this load may correspond to a shuffle instruction. The register state will look at the previous values, use them to CAM into a ROM and see that these offsets correspond to a known permutation instruction. In parallel, the load is being turned into a vector load by the opcode generation logic. Both of these instructions are inserted into the microcode buffer. Additionally, a pointer from the register state is used to remove the vector load created for instruction 2; a load of the offset is not necessary once the butterfly is inserted. This process of creating a load and shuffle is repeated for instruction 5.

Translating the remaining instructions in this example is just a matter of applying the rules presented in the table of FIG. 10. Any instruction that does not match the rules defined in that table does not meet the proposed scalar virtualization format, and causes translation to abort. Once all scalar instructions have been translated, the outlined function returns, and the microcode buffer 950 writes the SIMD instructions into the microcode cache. This enables the SIMD code to be inserted into the instruction stream upon subsequent encounters of the outlined function.

Results of simulations performed to evaluate and validate the present technique will be described below with reference to FIGS. 12A, 12B and FIG. 13.

FIG. 12A is a table detailing the number of scalar instructions in outlined functions in a series if test simulations performed to evaluate the present technique.

FIG. 12B is a table providing simulation results illustrating that there is a reasonable time window for hardware-based dynamic translation according to the present technique to operate without adversely affecting data processing performance. The benchmarks listed in FIG. 12B specify the number of cycles between the first two consecutive calls to outlined hot loops for the corresponding program application. The first three columns show the number of outlined hot loops that have distances of less than 150, less than 300 and greater than 300 cycles between their first two consecutive calls respectively.

To evaluate the data processing system according to the present technique system, an experimental framework was built using a Trimaran research compiler (see "An infrastructure for research in ILP", 2000, Trimaran. http://www.trimaran.org/.) and the SimpleScalar ARM simulator (see "Simplescalar: An infrastructure for computer system modeling", T. Austin, E. Larson, and D. Ernst., IEEE Transactions on Computers, 35(2):59-67, February 2002).

Trimaran was retargeted for the ARM instruction set, and was used to compile scalar ARM assembly code. The ARM assembly code was then hand-modified to include SIMD optimizations and conversion to the proposed scalar representation using a maximum targeted SIMD width of 16. Automatic SIMDization would have been used had it been implemented in our compiler. Again, automatic SIMDization is an orthogonal issue to abstracting SIMD instruction sets.

In our evaluation, SimpleScalar was configured to model an ARM-926EJ-S [2], which is an in-order, five stage pipelined processor with 16K, 64-way associative instruction and data caches. A parameterized SIMD accelerator, executing the Neon ISA, was added to the ARM-926EJ-S SimpleScalar model to evaluate the performance of SIMD accelerators for various vector widths. Simulations assumed dynamic translation took one cycle per scalar instruction in an outlined function. However, we demonstrate that dynamic translation could have taken tens of cycles per scalar instruction without affecting performance.

The present technique was evaluated using fifteen benchmarks from SPECfp2000 (171.swim, 179.art, 172.mgrid), SPECfp95 (101.tomcatv, 104.hydro2d), SPECfp92 (052.alvinn, 056.ear, 093.nasa7), MediaBench (GSM Decode and Encode, MPEG2 Decode and Encode), and common signal processing kernels (FFT, LU, FIR). The set of benchmarks evaluated was limited by applicability for SIMD optimization and the current capability of the ARM port of the compiler. None of these limitations were a result of the data processing system according to the present technique per se.

Dynamic Translation Requirements: In order to further understand the costs of the present technique, characteristics of benchmarks that impact design of a dynamic translator were studied. One such characteristic is the required size of the microcode cache. The microcode cache is used to store the SIMD instructions after an outlined procedure call has been translated. This characteristic is also important for software based translators, as it affects the size of code cache needed for the application.

It was found that supporting eight or more SIMD code sequences (i.e., hot loops) in the control cache is sufficient to capture the working set in all of the benchmarks investigated. One question remaining then is how many instructions are required for each of these loops. With a larger control cache entry size, larger loops may be translated, ultimately providing better application performance. The downside is increased area, energy consumption, and latency of the translator. However, large loops that do not fit into a single control cache entry may be broken up into a series of smaller loops, which do fit into control cache. The downside of breaking loops is that there will be increased procedure call overhead in the scalarized representation. This section later demonstrates that procedure call overhead is negligible when using an 8-entry control cache.

The table of FIG. 12A presents the average and maximum number of instructions per hot loop in the benchmarks. In some benchmarks like 172.mgrid and 101.tomcatv, hot loops in the Trimaran-generated assembly code consisted of more than 64 instructions, and were broken into two or more loops. This decreased the number of instructions in each loop dramatically because it also reduced the number of load and store instructions caused due to register spills. The FIG. 12A table shows that 172.mgrid and 101.tomcatv have the largest outlined functions with a maximum of nearly 64 instructions. In most of these benchmarks, it would be possible to decrease the number of instructions per loop to less than 32 in order to decrease the size of the microcode cache.

These results lead us to propose a control cache with 8 entries of 64 SIMD instructions each. Assuming each instruction is 32 bits, this would total a 2 KB SRAM used for storing translated instruction sequences.

Another benchmark characteristic that affects dynamic translator design is latency between two executions of hot loops. Translation begins generating SIMD instructions for outlined scalar code the first time that a code segment is executed. If translation takes a long time, then SIMD instructions might not be available for many subsequent executions of that hot loop. This could restrict the performance improvement achievable. Moreover, if translation takes a long time, then the dynamic translator will probably need some mechanism to translate multiple loops at the same time.

The FIG. 12B table shows the number of cycles between the two first consecutive calls to outlined hot loops for the benchmarks. In all benchmarks except MPEG2 Encode and Decode, there is more than 300 cycles distance between outlined procedure calls. The reason for large distances is that the scalar loops usually iterate several times over dozens of instructions, and also because memory accesses tend to produce cold cache misses. FIG. 12B shows that there is significant time for hardware based dynamic translation to operate without adversely affecting performance. A carefully designed JIT translator would likely be able to meet this 300 cycle target, as well.

FIG. 12B illustrates the speedup attained using one translated SIMD binary (per benchmark) on machines supporting different width SIMD accelerators. Speedup reported is relative to the same benchmark running on a ARM-926EJ-S processor without a SIMD accelerator and without outlining hot loops. Compiling with outlined functions would have added a small overhead (less than 1%) to the baseline results.

In the ideal case, a SIMD-enabled processor with unlimited resources can achieve a speedup of:

$$\frac{1}{\frac{S}{W}+(1-S)}$$

where S is SIMD optimizable fraction of the code and W is the accelerator vector width. Some of the factors that decrease the amount of speedup in real situations are cache miss penalties, branch miss predictions, and trip count of the hot loop.

As expected, speedup generally increases by increasing the vector width supported in the SIMD hardware. In some of the benchmarks, like MPEG2 Decode, there is virtually no performance gain by increasing the vector width from 8 to 16. This is because the hot loop(s) in these benchmarks operate on vectors that are only 8 elements. Supporting larger vector widths is not beneficial for these applications. 179.art shows the least speedup of any of the benchmarks run. In this case, speedup is limited because 179.art has many cache misses in its hot loops. Benchmark FIR showed the highest speedup of any benchmark because approximately 94% of its runtime is taken by the hot loop, the loop is fully vectorizable, and there are very few cache misses.

FIG. 13 schematically illustrates simulation results showing speedup for a number of benchmarks for different vector widths relative to a processor without SIMD acceleration. The callout 1310 in FIG. 13 shows the speedup improvement for a processor with built-in ISA support for SIMD instructions. FIG. 13 shows that SIMD acceleration is very effective for certain benchmarks. However, this fact has been well established and is not the purpose of this paper. The main purpose of FIG. 13 is to demonstrate the performance overhead of using dynamic translation in a system according to the present technique. Overhead stems from executing SIMD loops in their scalar representation whenever the SIMD version does not reside in the microcode cache. To evaluate the overhead, the simulator was modified to eliminate control generation. That is, whenever an outlined function was encountered, the simulator treated it like native SIMD code.

The performance improvement from using native instructions was measured for all fifteen benchmarks. Of these benchmarks, the largest performance difference occurred in FIR, illustrated in the callout of FIG. 13. Native SIMD code provided 0.001 speedup above the translated SIMD binary according to the present technique. This demonstrates that the performance overhead from virtualization is negligible.

Code Size Overhead:

Compilation for the data processing system according to the present technique does increase the code size of applications. Code size overhead comes from additional branch-and-link and return instructions used in function outlining, converting SIMD instructions to scalar idioms, and also from aligning memory references to a maximum vectorizable length. Obviously, too much code size expansion will be problematic, creating instruction cache misses, which may affect performance.

To evaluate code size overhead, the binary sizes of unmodified benchmarks were compared with versions included the translated SIMD according to the present technique. The maximum difference observed occurred in hydro2d, and was less than 1%. The reason behind this is that the amount of SIMD code in the benchmarks is very small compared to the overall program size. Thus it can be concluded that code size overhead due to in the present technique is essentially negligible.

The results of the simulations in FIG. 13 show that hardware overhead of dynamic optimization is modest, hardware changes do not affect cycle time of the processor, and the performance impact of abstracting the SIMD accelerator is negligible. We conclude that using dynamic techniques to map SIMD instructions corresponding to a first instruction set onto SIMD accelerators having different instruction set architectures is an effective way to improve computation efficiency, without the overhead associated with modifying the instruction set.

In conclusion, the embodiments described above make use of a combination of compiler support and dynamic translation to decouple the instruction set of a processor from the implementation of a particular SIMD accelerator. SIMD instructions are identified and expressed in a virtualized SIMD schema (functionally-equivalent scalar representation) using the scalar instruction set of a processor. A light-weight dynamic translation engine 900 (see FIG. 9) binds these scalar instructions for execution on an arbitrary SIMD accelerator during program execution. This alleviates the problems of binary compatibility and software migration that are inherent to instruction set modification.

The present technique provides a software schema powerful enough to virtualize nearly all SIMD instructions in the ARM Neon ISA using the scalar ARM instruction set. The design of a hardware dynamic translator (as described with reference to FIG. 9 above) shows that the software schema is translatable and that this translation can be incorporated into modern processor pipelines. Synthesis results (of simulations described with reference to FIGS. 12A, B and 13) show that the design has a critical path length of 16 gates and the area is less than 0.2 mm$^2$ in a 90 nm process. Experiments showed that the present technique caused a code size overhead of less than 1%, and performance overhead of less that 0.001% in the worst case. This data clearly demonstrates that the present technique is both practical and effective at solving the compatibility and migration issues associated with supporting multiple SIMD accelerators in a modern instruction set.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data under control of a program having a plurality of program instructions, said apparatus comprising:
   a processor;
   analysing circuitry configured to analyse at least a portion of said program to identify a single instruction multiple data (SIMD) instruction associated with a first SIMD instruction set architecture, to replace said identified SIMD instruction by a functionally-equivalent scalar representation comprising one or more scalar instructions of an instruction set architecture of said processor, and to mark said functionally-equivalent scalar representation; and
   translation circuitry configured to dynamically translate said marked functionally-equivalent scalar representation upon execution of said program, and to generate one or more corresponding translated instructions, wherein said translated instructions correspond to an instruction set architecture different from said first SIMD architecture.

2. Apparatus according to claim 1, wherein said translated instructions generated by said translation circuitry are scalar instructions.

3. Apparatus according to claim 1, wherein said translation circuitry generates from said functionally-equivalent scalar representation SIMD instructions corresponding to a second SIMD architecture different from said first SIMD architecture.

4. Apparatus according to claim 3, wherein said difference between said first SIMD architecture and said second SIMD architecture corresponds to a difference in SIMD vector-width.

5. Apparatus according to claim 3, wherein said difference between said first SIMD architecture and said second SIMD architecture corresponds to a difference in SIMD functionality.

6. Apparatus according to claim 1, wherein said analysing circuitry is arranged to perform said replacement of said identified SIMD instruction during compilation of said portion of program code.

7. Apparatus according to claim 6, wherein said compilation is a dynamic compilation.

8. Apparatus according to claim 1, wherein said analysing circuitry is arranged to perform said replacement using a post-compilation cross-compiler.

9. Apparatus according to claim 1, wherein said marking comprises outlining said functionally-equivalent scalar representation as a predetermined function.

10. Apparatus according to claim 9, wherein said predetermined function comprises surrounding said functionally-equivalent scalar representation by a branch-and-link instruction and a return instruction.

11. Apparatus according to claim 1, wherein said marking of said functionally-equivalent scalar representation is performed using an instruction set encoding.

12. Apparatus according to claim 1, wherein said marking of said functionally-equivalent scalar representation comprises storing information identifying said functionally-equivalent scalar representation in a data table in a memory.

13. Apparatus according to claim 1, wherein said analysing circuitry is arranged to generate said functionally-equivalent scalar representation by replacing a corresponding identified SIMD instruction by a scalar loop in which one element of a SIMD vector associated with said identified SIMD instruction is processed per iteration.

14. Apparatus according to claim 1, wherein said analysing circuitry is arranged to generate said functionally-equivalent scalar representation by replacing a corresponding identified SIMD instruction by a predetermined instruction sequence comprising a plurality of scalar instructions.

15. Apparatus according to claim 1, wherein when said identified SIMD instruction is a permutation instruction, said analysing circuitry is arranged to restrict said functionally-equivalent scalar representation such that permutation instructions occur only at memory boundaries of scalar loops of instructions.

16. Apparatus according to claim 1, wherein said processor is a pipelined processor arranged to process said portion of program code using an instruction pipeline comprising a plurality of pipeline stages.

17. Apparatus according to claim 16, wherein said translation circuitry is arranged to perform said dynamic translation after retirement of said scalar representation from said instruction pipeline.

18. Apparatus according to claim 16, wherein said translation circuitry is arranged to perform said dynamic translation at a decoding stage of said instruction pipeline.

19. Apparatus according to claim 17, comprising a microcode cache for storing said translated instructions for subsequent execution by said processor.

20. Apparatus according to claim 1, wherein said translation circuitry is arranged to perform said dynamic translation using software.

21. Apparatus according to claim 20, wherein said software comprises a virtual machine.

22. Apparatus according to claim 20, wherein said software comprises a just-in-time compiler.

23. Apparatus according to claim 1, wherein said translation circuitry is implemented at least in part by hardware.

24. Method for processing data under control of a program having a plurality of program instructions, said method comprising the steps of:
  analysing at least a portion of said program to identify a single instruction multiple data (SIMD) instruction associated with a first SIMD instruction set architecture, to replace said identified SIMD instruction by a functionally-equivalent scalar representation comprising one or more scalar instructions of an instruction set architecture of said processor, and to mark said functionally-equivalent scalar representation; and
  dynamically translating said marked functionally-equivalent scalar representation upon execution of said program to generate one or more corresponding translated instructions, wherein said translated instructions correspond to an instruction set architecture different from said first SIMD architecture.

25. A computer program product comprising a non-transitory computer readable storage medium containing computer readable instructions that when executed on a computer will implement the method of claim 24.

26. Method of dynamically translating program instructions comprising at least one marked functionally-equivalent scalar representation of a single instruction multiple data (SIMD) instruction corresponding to a first SIMD instruction set architecture, said method comprising the steps of:
  dynamically translating said marked functionally-equivalent scalar representation upon execution of said program and generating one or more corresponding translated instructions, wherein said translated instructions correspond to an instruction set architecture different from said first SIMD architecture.

27. A computer program product comprising a non-transitory computer readable storage medium containing computer readable instructions that when executed on a computer implement the method of claim 26.

28. Apparatus for dynamically translating program instructions comprising at least one marked functionally-equivalent scalar representation of a single instruction multiple data (SIMD) instruction corresponding to a first SIMD instruction set architecture, said apparatus comprising:
  translation circuitry configured to dynamically translate said marked functionally-equivalent scalar representation upon execution of said program and to generate one or more corresponding translated instructions, wherein said translated instructions correspond to an instruction set architecture different from said first SIMD architecture.

29. Apparatus according to claim 28, comprising partial decoding circuitry for partially decoding incoming instructions to identify said marked functionally-equivalent scalar representation.

30. Apparatus according to claim 28, comprising legality checking circuitry for monitoring incoming instructions to check whether said incoming instructions are amenable to translation.

31. Apparatus according to claim 28, comprising register state circuitry for storing register state corresponding to said SIMD instruction corresponding to a first SIMD instruction set architecture and wherein said translation circuitry has access to said stored register state information.

32. Apparatus according to claim 28, comprising a buffer for storing said translated instructions.

33. A computer program product stored on a non-transitory computer readable carrier storage medium storing a program which when implemented on a computer provides program instructions comprising analysing functionally-equivalent scalar representations of respective single instruction multiple data (SIMD) instructions corresponding to a first SIMD instruction set architecture, and marking said functionally-equivalent scalar representations to enable identification by a dynamic translator for dynamic translation to translated instructions corresponding to a different instruction set architecture from said first SIMD instruction set architecture.

34. Apparatus for processing data under control of a program having a plurality of program instructions, said apparatus comprising:
  means for processing;
  means for analysing at least a portion of said program to identify a single instruction multiple data (SIMD) instruction associated with a first SIMD instruction set architecture, for replacing said identified SIMD instruction by a functionally-equivalent scalar representation comprising one or more scalar instructions of an instruction set architecture of said means for processing, and for marking said functionally-equivalent scalar representation; and
  means for dynamically translating said marked functionally-equivalent scalar representation upon execution of said program and for generating one or more corresponding translated instructions, wherein said translated instructions correspond to an instruction set architecture different from said first SIMD architecture.

35. Method of compiling a program comprising at least one single instruction multiple data (SIMD) instruction corresponding to a first SIMD instruction set architecture, said method comprising the steps of:
  identifying said at least one SIMD instruction;
  replacing said identified SIMD instruction by a functionally-equivalent scalar representation comprising one or more scalar instructions; and
  marking said functionally-equivalent scalar representation.

* * * * *